US011999474B2

United States Patent
Netzer

(10) Patent No.: US 11,999,474 B2
(45) Date of Patent: Jun. 4, 2024

(54) AIRCRAFT ROTOR PROTECTION

(71) Applicant: Yoav Netzer, Moers (DE)

(72) Inventor: Yoav Netzer, Moers (DE)

(73) Assignee: Yoav Netzer, Moers (DE)

( * ) Notice: Subject to any disclaimer, the term of this patent is extended or adjusted under 35 U.S.C. 154(b) by 368 days.

(21) Appl. No.: 17/291,546

(22) PCT Filed: Nov. 5, 2018

(86) PCT No.: PCT/IL2018/051176
§ 371 (c)(1),
(2) Date: May 5, 2021

(87) PCT Pub. No.: WO2020/095288
PCT Pub. Date: May 14, 2020

(65) Prior Publication Data
US 2022/0001977 A1    Jan. 6, 2022

(51) Int. Cl.
*B64D 45/06*    (2006.01)
*B64C 29/00*    (2006.01)
*B64C 39/02*    (2023.01)
*B64U 30/20*    (2023.01)
*B64U 70/80*    (2023.01)
(Continued)

(52) U.S. Cl.
CPC ........ *B64C 29/0033* (2013.01); *B64C 39/024* (2013.01); *B64D 45/06* (2013.01); *B64U 30/10* (2023.01); *B64U 30/20* (2023.01); *B64U 70/80* (2023.01); *B64U 2101/60* (2023.01)

(58) Field of Classification Search
CPC .............................. B64D 45/06; B64U 30/299
See application file for complete search history.

(56) References Cited

U.S. PATENT DOCUMENTS 6,244,818 B1 *   6/2001   Chang .................. F04D 29/703
                                                    416/247 R
2009/0045295 A1   2/2009   Lundgren
                         (Continued)

FOREIGN PATENT DOCUMENTS

CN    109204854 A  *  1/2019
CN    109264006 A  *  1/2019   ............. B64D 17/62
                         (Continued)

OTHER PUBLICATIONS

International Search Report & Written Opinion for PCT dated Jul. 17, 2019, Application No. PCT/IL2018/051176 filed Nov. 5, 2018.

*Primary Examiner* — Christopher P Ellis
(74) *Attorney, Agent, or Firm* — A.C. Entis-IP Ltd; Allan C. Entis

(57) ABSTRACT

Embodiments of the disclosure are directed to a convertible rotor aircraft CRA able to convert between airplane and helicopter flight modes during flight, comprising a tillable proprotor assembly TPA comprising a proprotor. Optionally, the CRA comprises a flight control module FCM configured to control the TPA to reverse direction of thrust generated by the proprotor relative to the TPA when the TPA transitions between a first orientation for helicopter flight and a second orientation for airplane flight. Optionally, the CRA comprises a deployable guard for the proprotors, configured to have a stowed state and a deployed state, wherein: the guard in the deployed state is controlled to be configured as a partially air-permeable barrier.

18 Claims, 17 Drawing Sheets

(51) Int. Cl.
*B64U 30/10* (2023.01)
*B64U 101/60* (2023.01)

(56) References Cited

U.S. PATENT DOCUMENTS

| | | | |
|---|---|---|---|
| 2016/0016664 A1* | 1/2016 | Basuni | B64C 27/08 |
| | | | 244/17.13 |
| 2016/0200436 A1 | 7/2016 | North et al. | |
| 2016/0207368 A1 | 7/2016 | Gaonjur | |
| 2017/0036760 A1 | 2/2017 | Stan | |
| 2018/0155018 A1* | 6/2018 | Kovac | B64D 45/04 |
| 2018/0222580 A1 | 8/2018 | DeLorean | |
| 2019/0206266 A1* | 7/2019 | Taveira | G08G 5/04 |
| 2019/0382120 A1* | 12/2019 | Nakamura | B64D 25/00 |
| 2020/0079503 A1* | 3/2020 | Bailey | B64C 23/069 |
| 2020/0277054 A1* | 9/2020 | Lee | B64C 27/08 |
| 2022/0001977 A1* | 1/2022 | Netzer | B64C 29/0033 |
| 2022/0219830 A1* | 7/2022 | Zhang | B64D 31/06 |
| 2023/0110109 A1* | 4/2023 | Watanabe | B64U 20/80 |
| | | | 244/121 |

FOREIGN PATENT DOCUMENTS

| | | | | | |
|---|---|---|---|---|---|
| CN | 213057500 U | * | 4/2021 | | |
| CN | 113371213 A | * | 9/2021 | | |
| CN | 113895622 A | * | 1/2022 | | |
| CN | 216332732 U | * | 4/2022 | | |
| CN | 218431808 U | * | 2/2023 | | |
| KR | 101610801 B1 | * | 1/2015 | | |
| WO | 2017153807 | | 9/2017 | | |
| WO | WO-2021191974 A1 | * | 9/2021 | | B64C 25/54 |
| WO | WO-2022072551 A1 | * | 4/2022 | | |

* cited by examiner

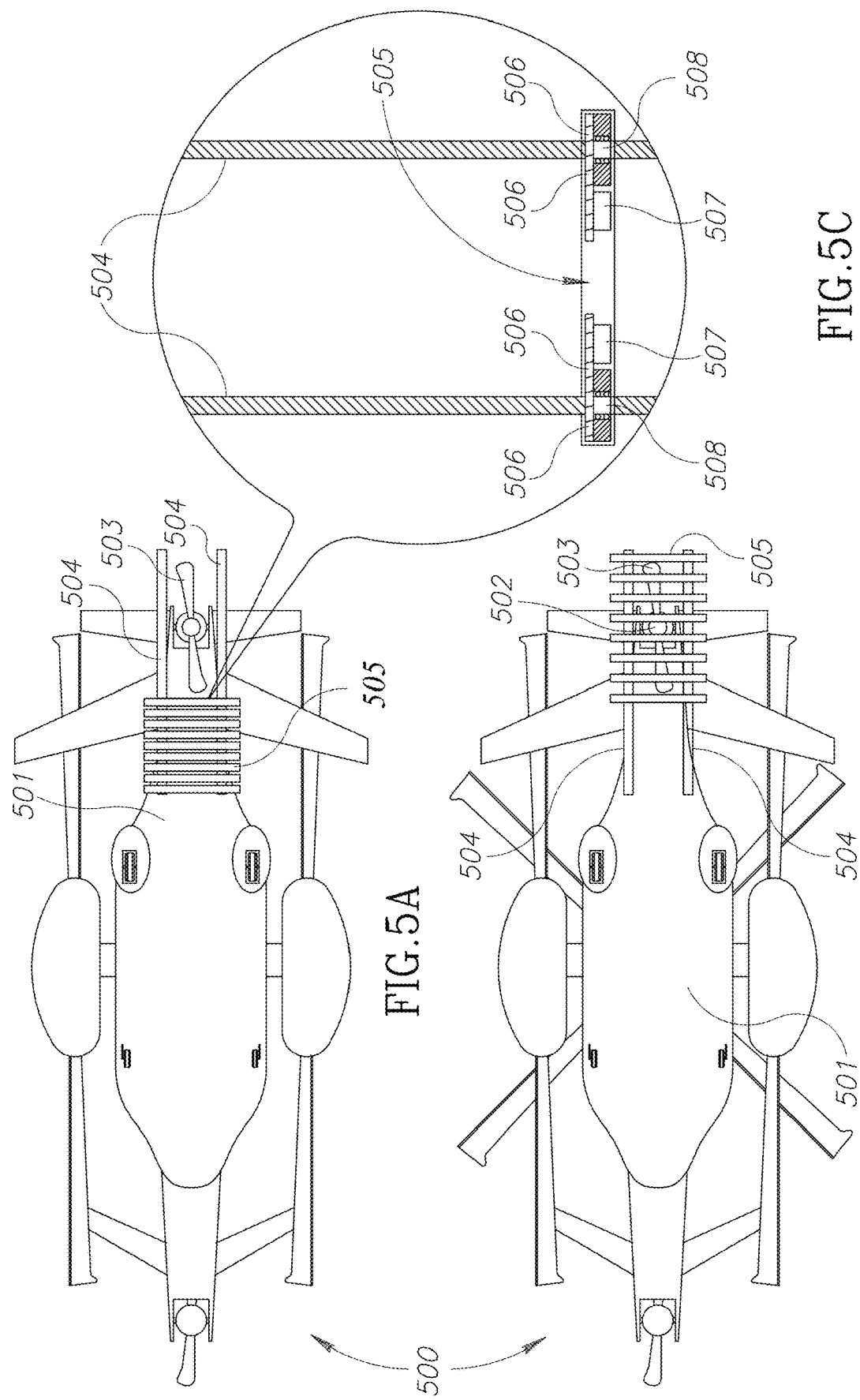

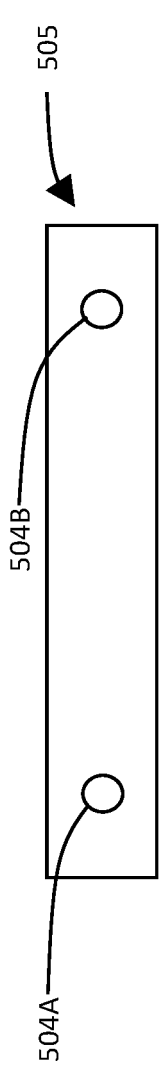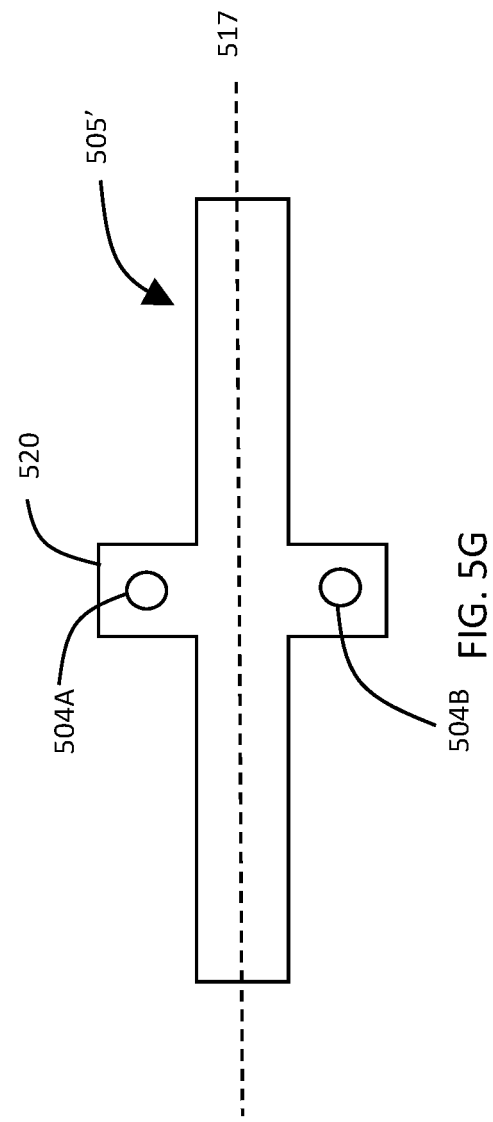

AIRCRAFT ROTOR PROTECTION

RELATED APPLICATIONS

The present application is a U.S. National Phase of PCT Application No. PCT/IL2018/051176, filed on Nov. 5, 2018. The contents and disclosures of this prior application is incorporated herein by reference in its entirety.

BACKGROUND

Convertible rotor aircrafts (CRAs) are machines capable of both a helicopter flight mode that allows for vertical flight and vertical takeoff and landing (VTOL), an airplane flight mode (which may be alternatively referred to as a "horizontal flight mode"), and in some cases a hybrid flight mode that combines aspects of helicopter and airplane flight modes. CRAs have been designed ranging in size and scope, for example, large aircraft capable of carrying passengers to small handheld unmanned aerial vehicles (UAV). UAVs, for example drones, are increasingly being used for a variety of applications, including logistics applications such as delivery of packages as well as recreational applications such as taking photographs or videos from aerial positions. While the dimensions and configuration of propellers provide thrust for airplanes and the dimensions and configuration of rotors provide lift for helicopters, CRAs typically utilize proprotors that combine features of propellers and rotors thereby providing both lift and thrust depending on the orientation of the proprotor.

In order for the CRA to transition between helicopter and airplane flight modes, each proprotor is typically connected to a rotating engine pod (REP) via an axel as part of a tiltable proprotor assembly (TPA). By being part of a TPA, a proprotor is tiltable to change orientation of its angle of rotation as well as orientation of thrust generated by the rotating proprotors, and the TPA is operable to transition between a vertical flight mode in which a substantially vertical thrust is generated to provide lift and a horizontal flight mode in which a substantially horizontal thrust is generated. Horizontal thrust that is oriented to propel the CRA in a forward direction may be referred to herein as "forward thrust". It will be noted that a TPA may be oriented during a vertical flight mode so that the thrust provided by the TPA also includes a horizontal component that is small relative to the primary vertical component, in order to move the CRA in a horizontal direction. It will also be noted that a TPA may be oriented during a horizontal flight mode so that the thrust provided by the TPA also includes a vertical component that is small relative to the primary horizontal component, in order to provide lift to the CRA. The CRA optionally comprises a plurality of TPAs depending on its intended purpose. Front, lateral and rear TPAs are optionally housed on the end of front, lateral and tail booms respectively. CRA's typically comprise a computer-based flight control module (FCM) to coordinate function of TPAs during flight, including during transitions between VTOL and horizontal flight mode.

The proprotors of a CRA may rotate at several hundred rpm. If proprotor hits an object, it may damage, injure or kill it. The contact may also damage the proprotor. Therefore, there is a need in the art to mitigate risk of damage and harm posed by proprotors.

SUMMARY

Typically, a proprotor comprised in a TPA is connected to and rotated by a spinning axel that is driven by an REP connected to the axel. While the position of the proprotor relative to the REP may be fixed, the orientation of the proprotor with respect to the REP changes when the TPA tilts. For convenience of presentation; a TPA that is tilted in an orientation in which the proprotor is above the REP is referred to herein as "pointing up"; a TPA that is tilted in an orientation in which the proprotor is below the REP is referred to herein as "pointing down"; a TPA that is tilted in an orientation in which the proprotor is in front of the REP with respect to the CRA is referred to herein as "pointing forward"; and a TPA that is tilted in an orientation in which the proprotor is behind the REP with respect to the CRA is referred to herein as "pointing backwards".

In accordance with an embodiment of the disclosure, the CRA comprises an FCM configured to control at least one TPA to transition between pointing up during a vertical flight mode (or helicopter mode) and pointing backwards during a horizontal flight mode (or airplane mode). In an embodiment, the FCM is configured to control the TPA is to reverse direction of thrust generated by the proprotor relative to the TPA and REP during the transition between horizontal flight mode and vertical flight mode. Optionally, thrust reversal is achieved by maintaining a same direction of rotation of the proprotor axel and rotating each blade of the proprotor around its respective long axis to reverse the respective blade's angle of attack. Optionally, thrust reversal is achieved by reversing the direction of rotation of the proprotor. Optionally, thrust reversal is achieved by the TPA comprising two proprotors that are configured to produce thrust in opposite directions, such that a first proprotor is rotated in vertical flight mode and a second proprotor is rotated in horizontal flight mode.

An aspect of an embodiment of the disclosure relates to deployable guards for shielding proprotor blades of a TPA. In an embodiment, the CRA comprises deployable proprotor guards (PGs) that are operable to be in a stowed state and a deployed state. The PG in a deployed state is configured, shaped and/or situated to be downstream of airflow generated by the proprotor during VTOL and creates a barrier between the blades and foreign objects, optionally below the proprotor, whilst simultaneously allowing for passage of air through the PG. The PG in a stowed state is configured, shaped and/or situated to reduce the exposure of the PG to airflow generated by the proprotor and/or to reduce drag of the CRA generated by the PG during horizontal flight.

In an embodiment of the disclosure, the proprotor guards are stowed during horizontal flight mode and deployed during at least a portion of time during vertical flight mode, by way of example during VTOL.

In an embodiment of the disclosure, the PG is shaped to have a comb-like morphology, comprising a plurality of spokes, slats, or blades. Alternatively, the PG is shaped to have a mesh-like morphology.

In an embodiment of the disclosure, PGs in a stowed state are positioned such that they lie flat under the CRA, by way of example a fuselage of the CRA. In an alternative embodiment, where the CRA is configured to carry a payload or delivery package affixed under its body, the PGs in a stowed state are stowed flush against or near a surface of the payload.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Unless otherwise indicated, the word "or" in the description and claims is considered to be the inclusive "or" rather than the exclusive or, and indicates at least one of, or any combination of items it conjoins.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

FIG. 5A shows a schematic view of a CRA as viewed from beneath the aircraft with a PG comprising self-propelled slats in a stowed position, in accordance with an embodiment of the disclosure;

FIG. 5B shows a schematic view of a CRA as viewed from beneath the aircraft with a PG comprising self-propelled slats in a deployed position, in accordance with an embodiment of the disclosure;

FIGS. 5C-5E schematically show close-up schematic views of a self-propelled slat comprised in a PG in accordance with an embodiment of the disclosure; and FIGS. 5F-5G schematically show alternative shapes for a self-propelled slat comprised in a PG in accordance with an embodiment of the disclosure.

DETAILED DESCRIPTION

Figure 1A:
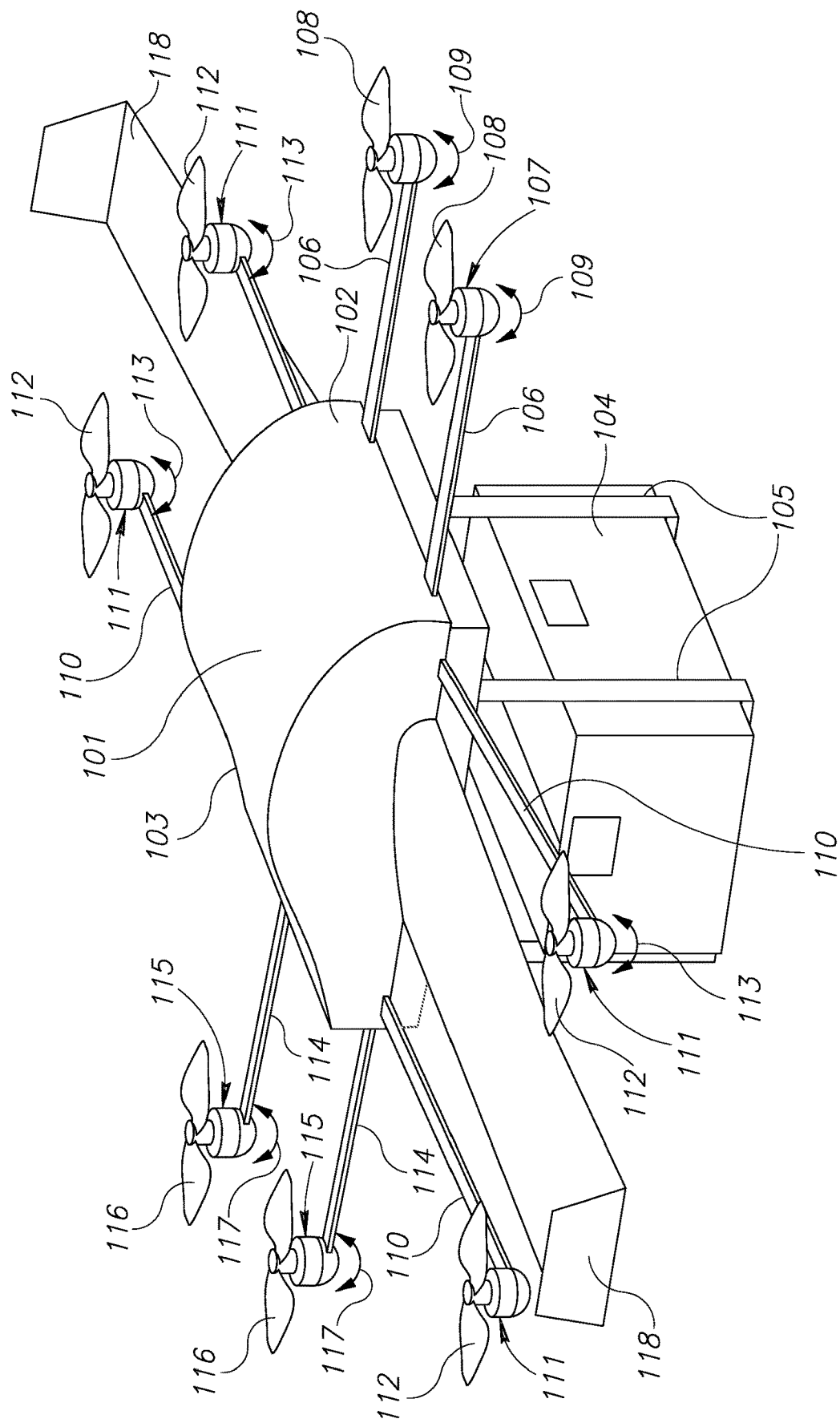
FIG. 1A shows a schematic perspective view illustration of an unmanned aerial vehicle (UAV) during vertical flight mode, in accordance with an embodiment of the disclosure.

FIG. 1A schematically illustrates a UAV 100. In FIG. 1A, UAV 100 is configured to be in VTOL mode. In an embodiment of the disclosure UAV 100 comprises airfoil wings 118, however, the principles of the disclosure may similarly be applied to UAV 100 without wings. The UAV includes a main body 101, in which the front of the UAV main body 102 is facing, in this illustration, towards the right of the figure and the rear of the UAV main body 103 is facing, in this illustration, towards the left of the figure. Therefore, in FIG. 1A, horizontal forward flight would be from left to right.

In an embodiment of the invention, UAV 100, comprises two tiltable proprotor assemblies (TPAs), designated fore-TPAs 107 due to their position at the front of the UAV. Each fore-TPA comprises a proprotor 108 rotated by an REP (not shown) housed in the body of the TPA. Each of the fore-TPAs 107 is physically connected to UAV body 101 by a respective forward-boom 106. Fore-TPAs 107 are pivotably mounted on forward-boom 106, as indicated by arrows 109, coupled to appropriate actuators (not shown), so that they are operable to point forward, as well as upwards and/or downwards. Optionally, fore-TPAs 107 are configured to have a range of rotation of about 90 degrees or about 180 degrees. Fore-TPAs 107, as shown in FIG. 1A are pointed upward to produce a downward flow of air (downdraft) and thus generate lift.

UAV 100 further comprises four TPAs, designated side-TPAs due to their lateral position respective to UAV body 101. Each of side-TPAs 111, respectively, comprise an REP housed in the body of the TPA and a proprotor 112, and is physically connected to UAV body 101 by a respective side-boom 110. Side-TPAs 111 are pivotably mounted (schematically indicated by arrows 113) on the respective side-booms, and coupled to appropriate actuators (not shown), so that they are operable to point upwards and/or downwards, as well as forwards and/or backwards. Optionally, side-TPAs 111 are configured to have a range of rotation of about 90 degrees, about 180 degrees, about 270 degrees, or about 360 degrees. Side TPAs 111, as shown in FIG. 1a are pointed upward to produce a downdraft and thus generate lift.

UAV 100 further comprises two TPAs, designated rear-TPAs 115, each comprising a REP (not shown) and a proprotor 116. Each one of the rear-TPAs 115 is connected to UAV body 101 by a respective tail-boom 114. Rear-TPAs 115 are pivotably mounted (schematically indicated by arrows 117) on rear-boom 114, and coupled to appropriate actuators (not shown), so that they are operable to point backwards, as well as upwards and/or downwards. Optionally, rear-TPAs 115 are configured to have a range of rotation of about 90 degrees or about 180 degrees. Rear-TPAs 115, as shown in FIG. 1a are pointed upward to produce a downdraft and thus generate lift.

In an embodiment of the disclosure, UAV 100 comprises an FCM (not shown) that is operatively connected to each of TPAs 107, 111, 115 to coordinate tilt angle and proprotor rotation of each TPA to control flight of UAV 100, autonomously and/or responsive to wireless instructions from a human operator. Optionally, control of the flight of UAV 100 comprises coordinating TPA tilt and proprotor rotation for the TPA, to execute mid-air transitions between a vertical flight mode and a horizontal fight mode. In an embodiment of the disclosure, the FMC comprises a processor and a memory storing computer executable instructions and data, which provide TPA control and coordination functionalities in accordance with an embodiment of the disclosure.

In an embodiment of the invention, UAV 100 is a delivery UAV capable of carrying a package 104 held in position by support structures 105.

Figure 1B:
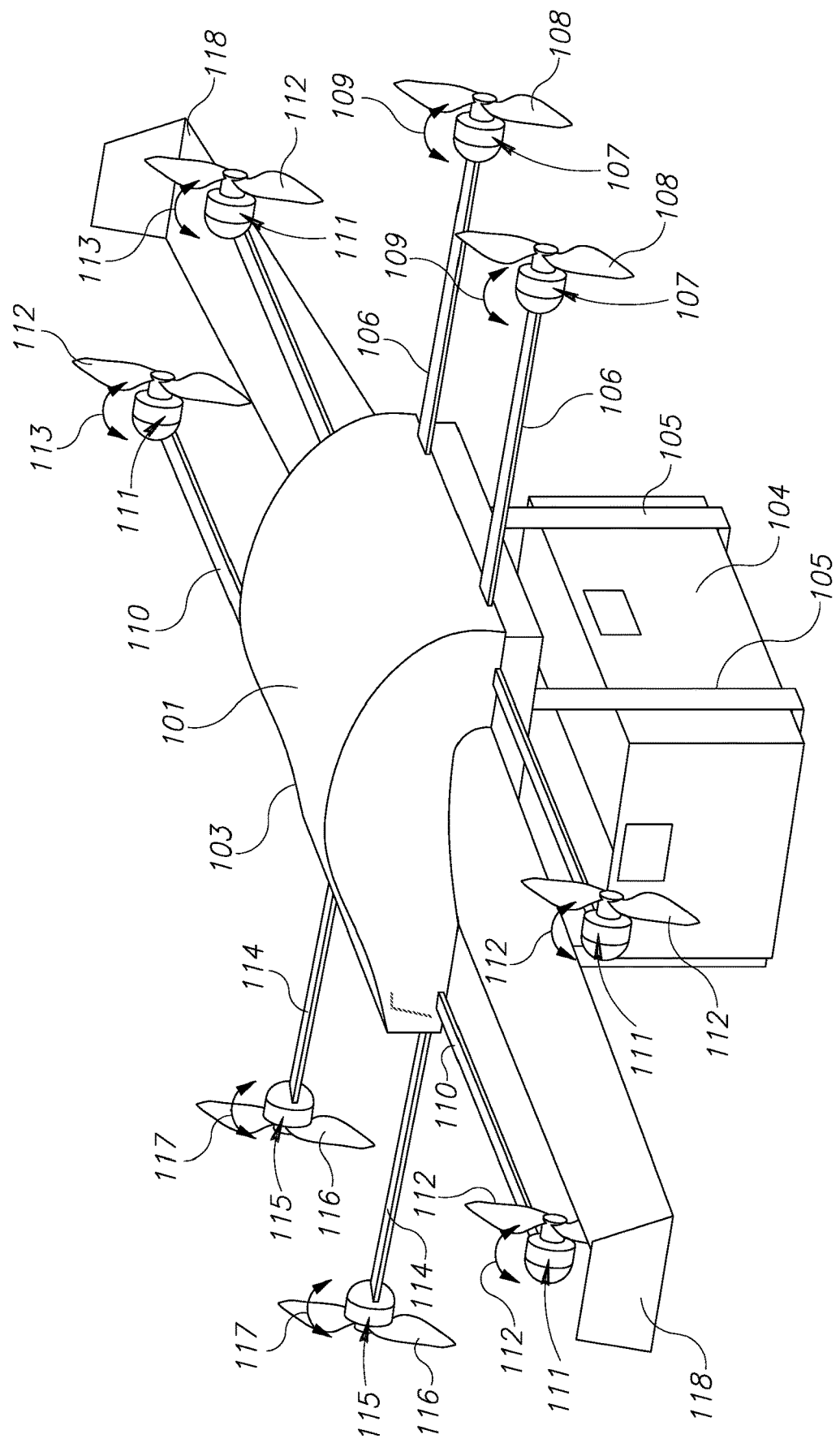
FIG. 1B shows a schematic perspective view illustration of a UAV during horizontal flight mode, in accordance with an embodiment of the disclosure.

FIG. 1B schematically illustrates UAV 100 when configured for horizontal flight in accordance with an embodiment of the disclosure. In horizontal flight mode, fore-TPAs 107 and side-TPAs 111 are tilted to point forward, thereby providing thrust for forward flight of UAV 100, with lift being provided by airfoil wings 118. However, due to the presence of tail-booms 114, rear-TPAs 115 cannot be rotated to point forward. Barring any adjustments, rotating rear-TPAs 115 from pointing upwards during vertical flight mode to pointing rearward for horizontal flight mode would result in rear-TPAs 115 generating thrust in a direction that is opposite to the thrust provided by fore-TPAs 107 and side-TPAs 111, thus hindering forward flight.

Aspects of the disclosure relate to methods of, or an FCM configured to coordinating TPA functions for, reducing the deleterious effects of incorrectly coordinated TPAs during transitions between horizontal and vertical flight modes. With regard to rear-TPAs 115 that have been tilted to point rearward, as shown in FIG. 1B, one option is to simply disengage the REP so that proprotor does not created the undesired thrust. However, it would be advantageous to coordinate the operation of the TPAs so that all available proprotors, including rear-TPAs 115, are utilized to contribute to producing thrust for forward flight.

In an embodiment of the disclosure, in order to overcome the problem of thrust being provided in the incorrect direction by the rear-TPAs 115, the FCM controls the operation of rear-TPAs 115 so the direction of thrust created by the rotation of proprotors 116 with respect to the TPA is reversed. For convenience of presentation, the reversal of thrust created by the proprotor with respect to the TPA (and the REP rotating the proprotor) may be referred to as "thrust reversal", and the thrust created by the proprotor after thrust reversal may be referred to a "reversed thrust".

Optionally, reverse thrust is achieved by reversing the direction in which proprotors 116 are rotated during horizontal and vertical flight modes. By way of example, the FCM controls rear-TPA 115 to rotate proprotor 116 in a clockwise direction when the TPA is pointed upwards during vertical flight mode and to rotate the proprotor in a counter-clockwise direction when the TPA is pointing backwards during horizontal flight mode. Optionally, in order to minimize lag time and allow for a smooth transition between different flight modes, as rear-TPA 115 rotates from pointing upward to pointing rearward, the FCM gradually reverses rotation of proprotor 116. By way of example, the FCM reduces the rotation of the REP as transition begins so that by the time rear-TPA 115 has rotated 45 degrees, halfway between vertical and horizontal flight modes, proprotors 116 are stationary, and by the time rear-TPA has rotated about 90 degrees, proprotors 116 are counterrotating vis-à-vis their direction of rotation during vertical flight mode. Forward thrust is thereby provided by the proprotors of fore-TPAs 107 as well as rear-TPAs 115 allowing for coordinated forward flight.

Alternatively, reverse thrust is achieved by rotating each blade of proprotor 116 around its respective long axis to reverse each blade's angle of attack. In this embodiment, the direction of the rotation of proprotors 116 remains the same whether the UAV 100 is in vertical or horizontal flight mode. Reversed thrust is optionally provided by reversible proprotors wherein the pitch of each individual proprotor blade can be set to negative values whilst in flight thereby ensuring that all available proprotors provide thrust in the correct direction for forward flight. By way of example, the angle of attack of the proprotor blades is reversed from about +5° to −5° when transitioning between vertical and horizontal modes.

Optionally, in order to minimize lag time and allow for a smooth transition between different flight modes, as rear-TPA 115 rotates from an upwards position to a horizontal position, the rotation of the individual proprotors blades are slowly adjusted. For example, initiation of transition between VTOL and horizontal flight mode leads to initiation of blade pitch reversal so that by the time rear-TPA 115 has rotated about 90 degrees, the pitch of each individual blade has been reversed and forward thrust is provided by the proprotors of fore-TPAs 107 as well as rear-TPAs 115 allowing for coordinated forward flight.

Proprotor blade designs may be optimized for one direction of rotation. By way of example, a proprotor blade typically has a first longitudinal edge shaped to advantageously serve as a leading edge and a second longitudinal edge shaped to advantageously serve as a trailing edge. Moreover, proprotor blades are typically shaped to generate thrust optimally within a relatively narrow range of angles of attack, and are typically shaped as cambered airfoil. Therefore, in certain embodiments, while thrust reversal can be achieved by reversing the direction of rotation of the proprotor or by reversing the angle of attack of the proprotor blades from a positive angle to a negative angle, the thrust that is generated in one direction may be substantially weaker compared to the other direction. However, combining counter-rotation of the proprotor together with rotating each blade of the proprotor around its respective long axis can advantageously allow for thrust reversal while mitigating a discrepancy in the ability of the proprotor to produce thrust before and after thrust reversal.

Figure 1D:
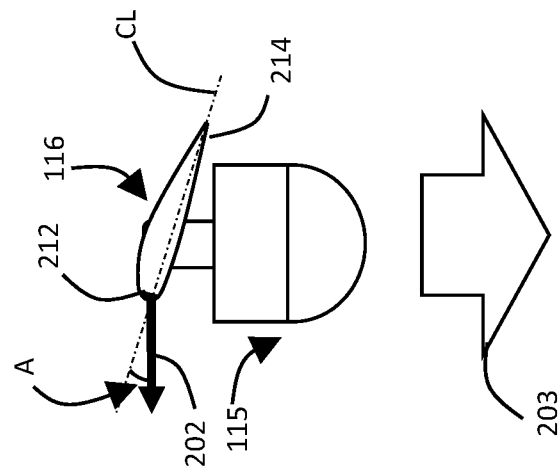
FIGS. 1C-D schematically show a TPA before thrust reversal, in accordance with an embodiment of the disclosure.
Figure 1C:
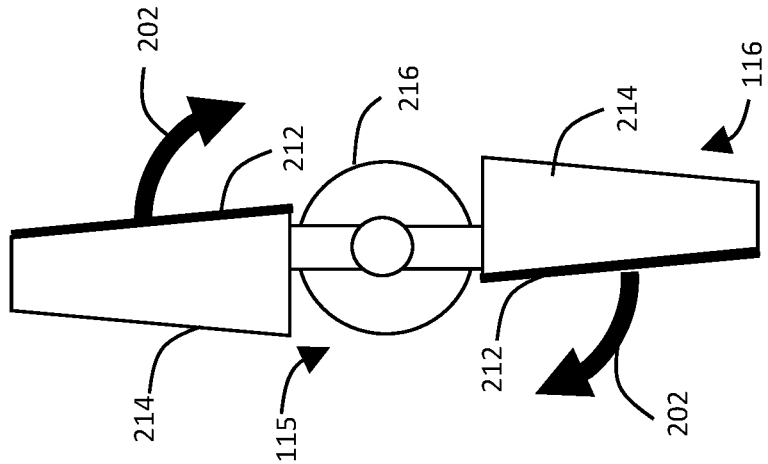
Figure 1E:
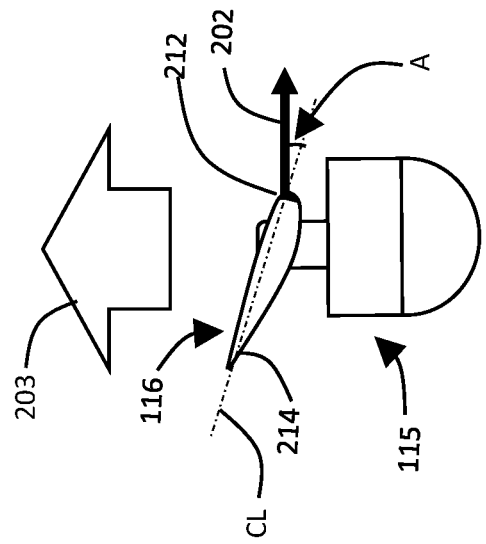
FIG. 1E schematically shows a TPA after a thrust reversal method, in accordance with an embodiment of the disclosure.
Figure 1F:
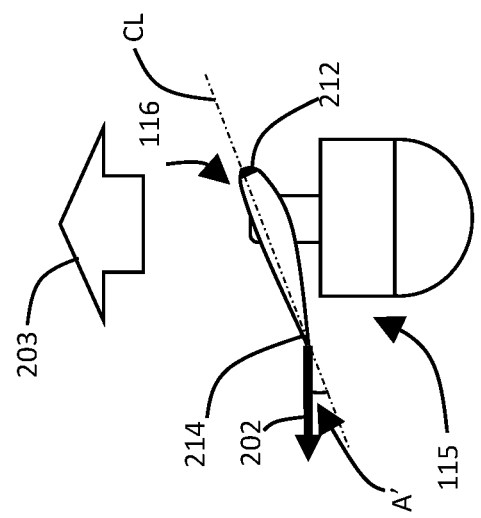
FIG. 1F schematically shows a TPA after an alternative thrust reversal method, in accordance with an embodiment of the disclosure.

Reference is made to FIGS. 1C-1F, schematically showing alternative views of rear-TPA 115. FIG. 1C shows rear TPA 115 viewed along the axis of rotation of proprotor 116 during vertical flight mode, with each blade of proprotor 116 having a leading edge 212 and a trailing edge 214. FIG. 1D shows rear TPA 115 during vertical flight mode viewed from the side of the TPA. FIGS. 1E and 1F, also from a side-view as with FIG. 1D, show optional embodiments of the rear-TPA during horizontal flight mode, after completion of alternative methods of thrust reversal.

Reference is made to FIGS. 1D and 1E, which shows rear TPA 115 before and after thrust reversal, respectively, in accordance with an embodiment of the disclosure. As shown in FIG. 1D, proprotor 116 is shaped as a cambered airfoil, so that that one face surface of the proprotor is more convex than the other face surface. Also shown are a chord line CL, an imaginary straight line joining leading edge 212 and the trailing edge of the proprotor, and an angle of attack of proprotor 116, which is indicated as angle A between chord line CL and the relative motion of proprotor 116 due to its rotation, schematically indicated by block arrow 202. The thrust generated by the rotation of proprotor 116 as configured in FIG. 1D is schematically indicated with an open block arrow 203. In an embodiment of the disclosure, thrust reversal is achieved in rear TPA 115 by maintaining the same direction of rotation of proprotor 116, and reversing the angle of attack. As shown FIG. 1E, reversal of thrust from the configuration of rear TPA 115 as shown in FIG. 1D is schematically indicated by a reversal of the direction of open block arrow 203 from a downward direction in FIG. 1D to an upward direction in FIG. 1E. To achieve thrust reversal in accordance with an embodiment of the disclosure, proprotor 116 continues to be rotated in a clockwise direction, as indicated by block arrow 202. However, the proprotor is rotated around its long axis so that leading edge 212 is oriented to serve as a trailing edge, trailing edge 214 is oriented to serve as a leading edge, and the angle of attack for the blade is reversed from a first attack angle A to a second attack angle A', which is optionally an inverse of attack angle A'. An angular distance for the rotation of the blades can be expressed as 180 degrees subtracted by the difference between attack angles A and A'. By way of numerical example, if angle of attack A as shown in FIG. 1D is 5 degrees, and the angle of attack A' as shown in FIG. 1E is −5 degrees, then each blade of proprotor 116 is rotated 170 degrees (180 degrees-10 degrees) around the blades' long axis to achieve the orientation for thrust reversal as shown in FIG. 1E. By way of example, angle of attack A before thrust reversal is about 5 degrees, and angle of attack A' after thrust reversal is about −5 degrees. It will be appreciated that a maximum thrust in the reverse-thrust configuration shown in FIG. 1E is typically weaker, as indicated by a smaller size of open block arrow 203, at least because the use of trailing edge 214 as a leading edge and the use of leading edge 212 as a trailing edge may reduce the maximum rotation speed of proprotor 116 compared to the blade orientation shown in FIG. 1D.

Reference is now made to FIGS. 1D and 1F which shows rear TPA 115 before and after an alternative method of thrust reversal in accordance with an embodiment of the disclosure. Optionally, thrust reversal is achieved by a combination of: (1) rotating each blade of proprotor 116 around its respective long axis about 180 degrees; and (2) counter-rotating the proprotor to rotate in a counter-clockwise direction. With this combined method, the proprotor 116 is rotated in a counter-clock wise direction, as indicated by the reversal in the direction of block arrow 202 between FIG. 1D and FIG. 1F, while angle of attack A, relative to the reversed direction of rotation of the proprotor, remains unchanged. In the configuration shown in FIG. 1F, the thrust due to the angle of attack and the thrust produced by the cambered airfoil shape of the proprotor are in the same directions, as is the case prior to thrust reversal. In addition, in the thrust reversal a shown in FIG. 1F, leading edge 212 and trailing edge 214 retain their respective roles even after thrust reversal is completed (in contradistinction to the thrust reversal shown in FIG. 1E, in which the roles of the leading and trailing edges are reversed). Therefore, the strength of the reversed thrust produced by the rear-TPA as shown in FIG. 1F can be equal to the thrust by the rear-TPA prior to thrust reversal as shown in FIG. 1D.

Optionally, an FCM controls rear-TPA 115 so that a transition of rear-TPA 115 from pointing upward in vertical flight mode to pointing rearward in horizontal flight mode is coordinated with the following steps for achieving thrust reversal: brake proprotor 116; rotate individual proprotor blades about 180 degrees about their respective long axes; and counter-rotate proprotor 116 in an opposite rotational direction. Optionally, an FCM controls rear-TPA 115 so that a transition of rear-TPA 115 from pointing rearward in horizontal flight mode to pointing upward in vertical flight mode is coordinated with the following steps for achieving thrust reversal: brake proprotor 116; rotate individual proprotor blades about 180 degrees about their respective long axes; and counter-rotate proprotor 116 in an opposite rotational direction.

Figure 2A:
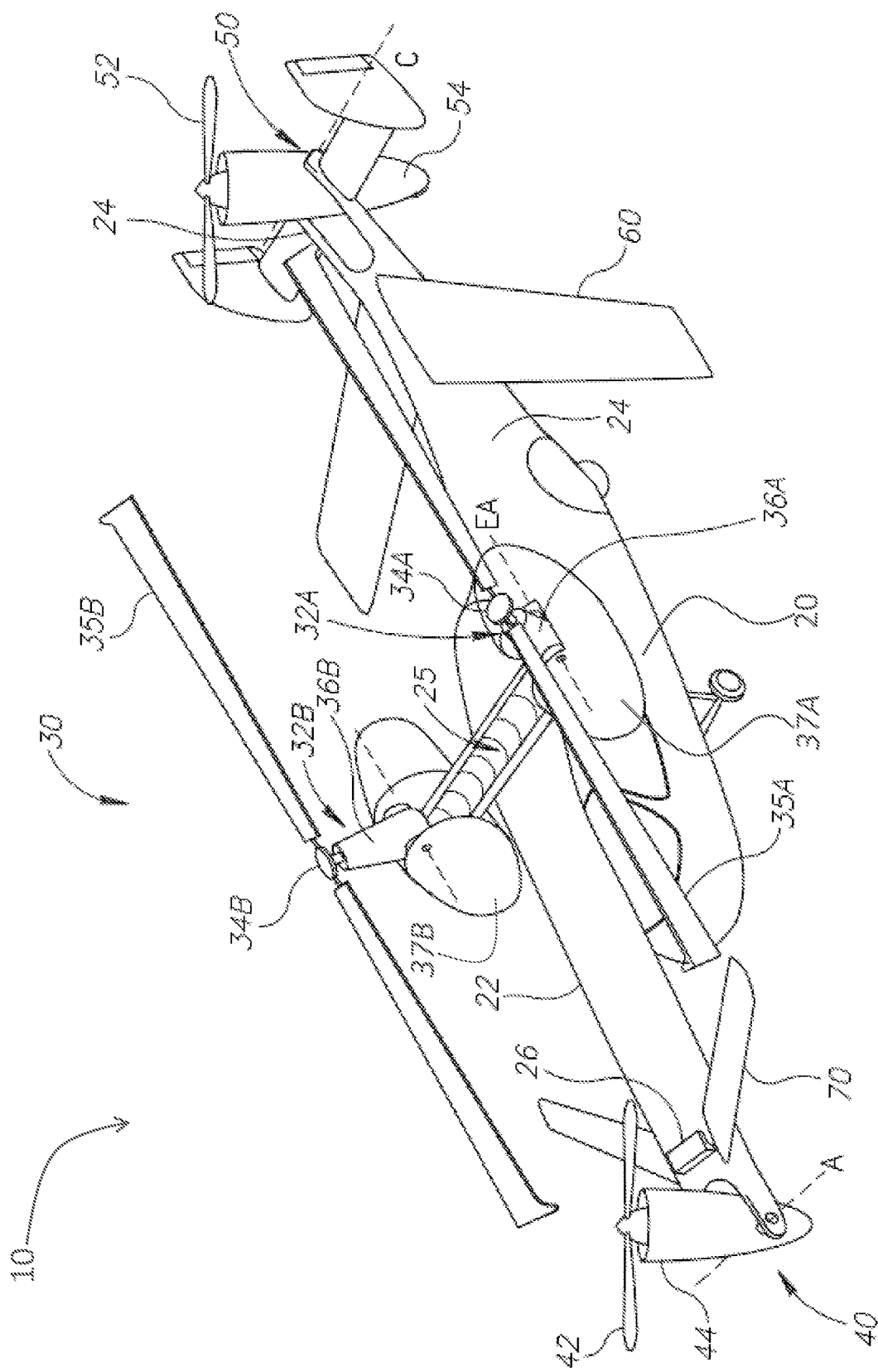
FIG. 2A shows a schematic perspective view illustration of a CRA in helicopter mode in accordance with an embodiment of the disclosure.

FIG. 2A schematically illustrates a CRA 10, which in contrast to UAV 100 as schematically shown in FIGS. 1A-1B is capable of carrying a pilot and optionally passengers. In FIG. 2A, CRA 10 is configured for helicopter mode. In an embodiment of the disclosure, fore TPA 40 is mounted on forward boom 22, with forward boom 22 connecting fore TPA 40 to fuselage 20. Rear TPA 50 is mounted on tail boom 24 with tail boom 24 connecting rear TPA 50 to fuselage 20. Fore TPA 40 comprising a proprotor 42 driven by an REP 44 is pivotably mounted to fore boom 22. Fore TPA 40 comprises an actuator (not shown) that is used to rotate the fore TPA about axis A. Rear TPA 50 comprising a proprotor 52 driven by an REP 54 is pivotably mounted to rear boom 24. Rear TPA 50 comprises an actuator (not shown) that is used to rotate the rear-TPA about axis C. In helicopter mode TPAs 40 and 50 are tilted to be substantially vertical, thus creating downdraft and providing lift.

In an embodiment of the disclosure, CRA 10 also comprise a main rotor system 30 comprising twin rotors 32A and 32B in a synchropter configuration, on opposite sides of, and optionally equidistant from, the longitudinal axis of the CRA. Rotor 32A comprises hub 34A blades 35A and housing 36A, and rotor 32B comprises hub 34B, blades 35B and housing 36B. Rotors 32A, 32B are optionally mounted to fuselage 20, optionally via pylons 37A, 37B. Each rotor 32A and 32B are optionally canted outwards, away from the longitudinal axis of the CRA enabling blades 35A, 35B to clear the opposing rotor. In an embodiment of the disclosure the CRA includes wings, such as main wings 60 and supplemental wings 70 for providing lift during horizontal flight.

In an embodiment of the disclosure, CRA 10 comprises an FCM (not shown) that is operatively connected to fore TPA 40 and rear TPA 50 to coordinate operation of each TPA to control flight of UAV 100, responsive to autonomous control and/or wireless instructions from a controller operated by a human operator. Optionally, control of the flight of CRA 10 comprises coordinating operation of TPAs 40 and 50, to execute mid-air transitions between a vertical flight mode (FIG. 2A) and a horizontal fight mode (FIG. 2B).

Figure 2B:
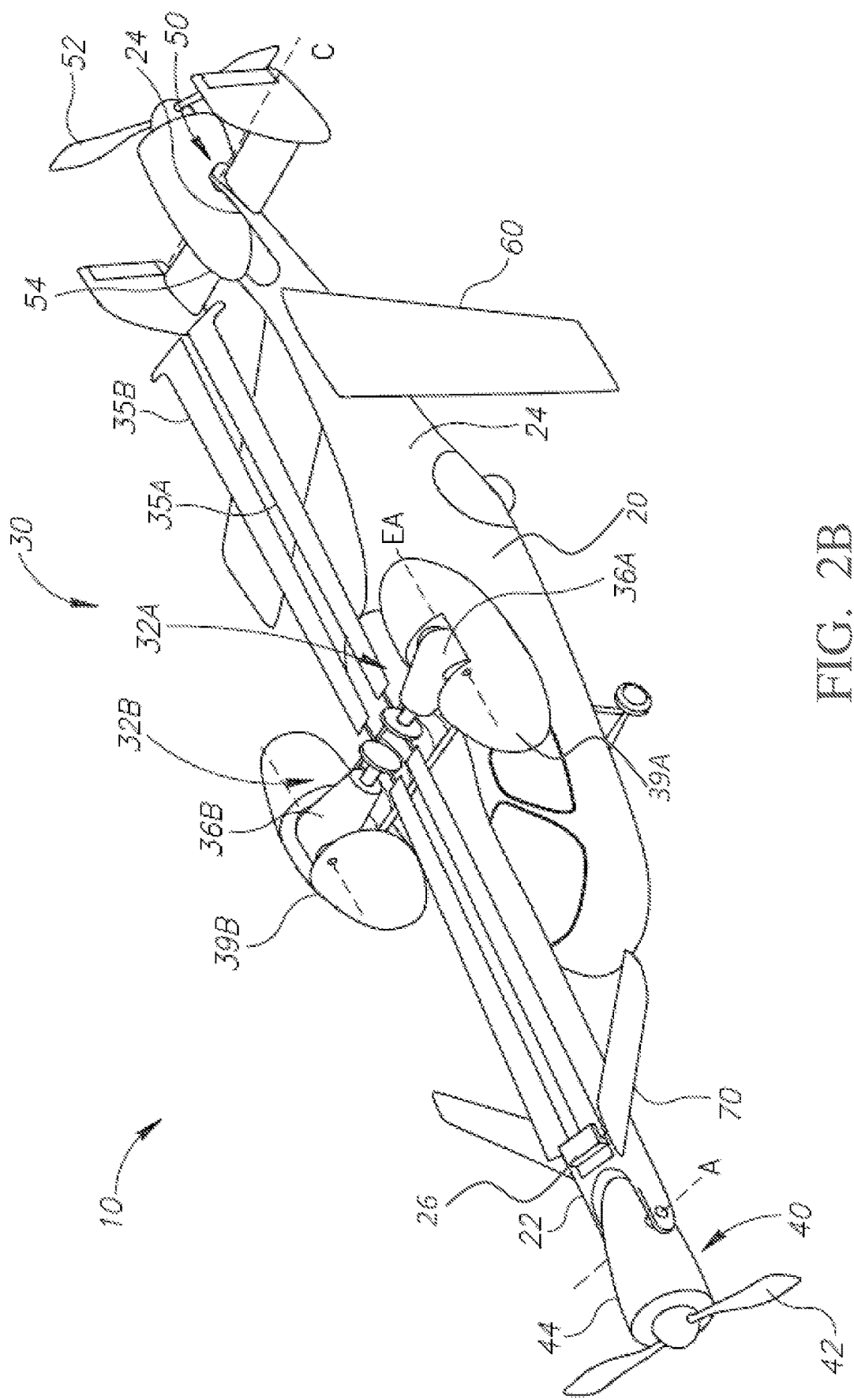
FIG. 2B shows a schematic perspective view illustration of a CRA in airplane mode in accordance with an embodiment of the disclosure.

FIG. 2B schematically illustrates CRA 10 during horizontal flight mode. In accordance with an embodiment of the disclosure, rotors 35A and 35B of the main rotor system 30 are pivotably mounted so that the rotors are operable to transition to a folded state where rotor blades are positioned along a body of the CRA, optionally fuselage and/or boom, to reduce drag and facilitate forward flight. Each of rotors 32A, 32B is pivotably mounted to allow for transition between a deployed state in which the rotors are functional to rotate blades 35A, 35B to provide lift (FIG. 2A), and a folded state (FIG. 2B) in which the aerodynamic profile of the rotors is reduced. As shown in FIGS. 2a-2b, CRA 10 comprises aerodynamic enclosures 39A, 39B that encloses a portion of rotor housing 36A, 36B, respectively, to provide an aerodynamically advantageous profile.

In an embodiment of the disclosure, FCM controls fore TPA 40 to tilt about 90 degrees about axis A to transition between pointing upward for helicopter mode and pointing forward for airplane mode, and controls rear TPA 50 to rotate about 90 degrees about axis C in a coordinated fashion during the same transition. Due to the physical constraints of tail boom 24 on rear-TPA 50, rear TPA cannot pivot to point forward but can pivot to point rearward. However, absent other changes, TPA 50 transitioning from pointing upward to pointing rearward would result in rear TPA 50 rearward thrust that would hinder forward flight for CRA 10.

In an embodiment of the disclosure, the FCM controls rear-TPA function so that, when in airplane mode, proprotors 52 are rotated in an opposite direction vis a vis their rotation during helicopter mode. As a result, by way of example, after rear TPA 50 is tilted about 90 degrees from pointing upward to point rearward, proprotor 52 undergoes thrust reversal to provide thrust in the same direction as proprotor 42. Optionally, in order to minimize lag time and allow for a smooth transition, the CM controls rear TPA 50 so that when it rotates about axis C from an upwards position to a horizontal position, the rotation of proprotors 52 are slowed down, such that when TPA 50 has rotated approximately 45 degrees, proprotors 52 are stationary and as TPA 50 continues to tilt about axis C, proprotors 42 start rotating in the opposite direction reaching full revolution speed when TPA 50 completes its tilting to point rearward.

In an embodiment of the disclosure, each blade of proprotors 52 are rotated around its respective long axis such that the pitch of each individual proprotor blade 52 is set to a negative value reversing the respective blade's angle of attack whilst maintaining the same overall direction of rotation of the proprotors. By way of example, the angle of attack is reversed from +5° during vertical flight to −5° during horizontal flight. Therefore, when TPA 50 tilts about 90 degrees and is pointing rearward, proprotors 52 provide thrust in the same direction as proprotors 42 to enable coordinated forward flight. In a further embodiment, in order to minimize lag time and allow for a smooth transition, as rear TPA 50 rotates about axis C from an upwards position to a horizontal position, the blade pitch are simultaneously adjusted gradually, so that by the time TPA 50 has tilted about 90 degrees, the pitch of each individual blade has been reversed and forward thrust is provided by the proprotors of rear TPA 50 as well as fore TPA 40 allowing for coordinated forward flight.

In an embodiment of the disclosure, a FCM controls rear TPA 50 to achieve thrust reversal in accordance with the disclosure provided hereinabove with respect to rear TPA 115, as shown in FIG. 1D (showing TPA 115 prior to thrust reversal) and 1E (showing TPA 115 following thrust reversal).

In an embodiment of the disclosure, a FCM controls rear TPA 50 to achieve thrust reversal in accordance with the disclosure provided hereinabove with respect to rear TPA 115, as shown in FIG. 1D (showing TPA 115 prior to thrust reversal) and 1F (showing TPA 115 following thrust reversal).

In an embodiment of the disclosure, a CRA comprises at least one dual-mode TPA (DMTPA) comprising an upstream proprotor and a downstream proprotor in a coaxial configuration. The term "upstream", as used to describe the proprotors, refers to the proprotor further forward in the direction of travel when TPA is in horizontal flight orientation and the term "downstream", as used to describe the proprotors, refers to the proprotor positioned away from the direction of travel when the TPA is in horizontal flight orientation. Although, the terms are particularly relevant for TPAs in horizontal flight mode, the assigned terms are maintained even when the TPAs are angled vertically for VTOL flight. The downstream proprotor are optionally configured to be more advantageous, relative to the upstream proprotor, to function as a rotor to provide lift for hovering and/or VTOL, and upstream proprotors are optionally configured to be more advantageous, relative to the downstream proprotor, to function as a propeller to provide thrust for forward flight. Blades of the downstream proprotor are characterized relative to blades of the upstream proprotor by one or a combination of two or more characteristics selected from: a longer length, a higher structural flexibility, and a thinner profile.

In accordance with an embodiment of the disclosure, an FCM independently controls rotation of the downstream and upstream proprotors, so that the two coaxial proprotors rotate at different speeds, or one proprotor rotates while the other proprotor is stationary. Coaxial proprotors are optionally be equi-rotating or counter-rotating.

Figure 3A:
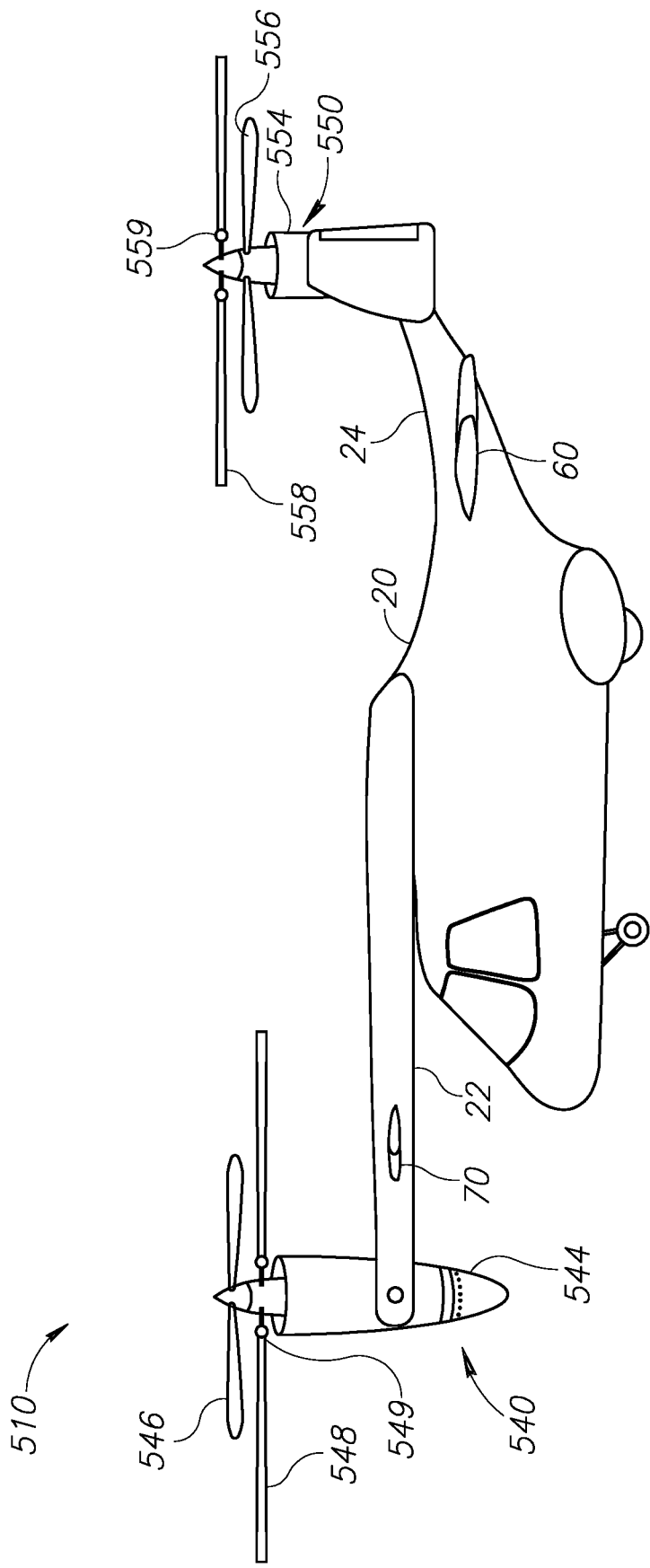
FIG. 3A shows a schematic side-view illustration of an alternative CRA comprising a dual mode tiltable proprotor assembly (DMTPA) in helicopter mode in accordance with an embodiment of the disclosure.
Figure 3B:
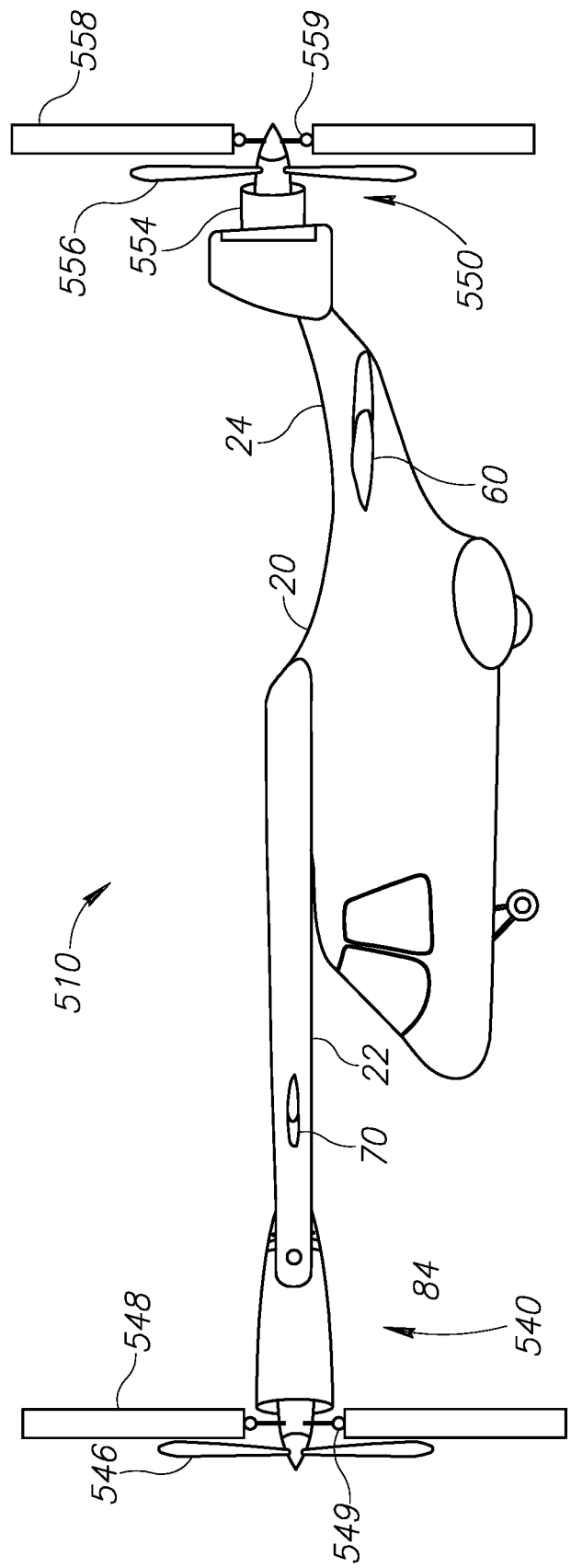
FIG. 3B shows a schematic side-view illustration of an alternative CRA comprising a DMTPA in airplane mode in accordance with an embodiment of the disclosure.

FIGS. 3A-3B schematically show an alternative CRA 510 that is substantially the same as CRA 10 schematically shown in FIGS. 2A-2B, with the exception that CRA 510 does not comprise main rotor system 30 and comprises two DMTPAs, a fore DMTPA 540 comprising an upstream proprotor 546 and a downstream proprotor 548, and a rear DMTPA 550 comprising an upstream proprotor 556 and a downstream proprotor 558. FIG. 3A shows CRA 510 in helicopter mode with DMTPAs 540, 550 pointing upward. In an embodiment of the disclosure, one or both proprotors of fore DMTPA are utilized during helicopter mode. However, if rear DMTPA 550 transitions from pointing upward to pointing rearward, barring other changes, DMTPA would produce thrust in the opposite direction needed for forward flight. In an embodiment of the disclosure, DMTPA 550 is operated so that only downstream proprotor 558 is used for helicopter mode upstream proprotor 556 used for airplane mode, and the proprotors are configured and controlled by the FCM to produce thrust in opposite directions with respect to each other, during the helicopter and airplane modes respectively. With such a configuration, rear DMTPA 550 successfully creates downdraft while pointing upward during helicopter mode and creates thrust for forward flight while pointing rearward during airplane flight.

FIG. 3B shows CRA 510 in airplane mode with fore DMTPA 540 pointing forward and rear DMTPA 550 pointing rearward. In an embodiment of the disclosure, in airplane mode, downstream proprotors 548, 558 are stationary and are stowed in a feathered orientation in order to minimize drag. In an embodiment of the disclosure, each of downstream proprotors 548 and 558 are rotatable along their respective long axes, actuated by rotational actuators 549 and 559 respectively.

In an embodiment of the disclosure, both proprotor 556 and 558 of rear DMTPA 550 provide lift when DMTPA 500 is pointing upwards and on transition to horizontal flight mode where DMTPA 500 points rearwards, proprotor 558 is stowed in a feathered position; the blades of proprotor 556 are rotated about 180 degrees about their long axis and proprotor 556 is counter-rotated vis a vis its direction when DMTPA 500 is pointing upwards. By way of example, the FCM controls the DMTPA 550 so that during a transition from vertical flight mode to horizontal flight mode the following sequential steps are employed; brake proprotors 556 and 558, stow proprotor 558 in a feathered position, rotate individual proprotor blades of proprotor 556 about 180 degrees about their long axis, tilt DMTPA 550 about 90 degrees downwards to its horizontal position and counter-rotate proprotor 556 with respect to its rotation during vertical orientation. Conversely the FCM controls DMTPA 550 so that on transition from horizontal flight mode to vertical flight mode the following sequential steps are employed; brake proprotor 556, tilt DMTPA 550 about 90 degrees upwards to its vertical position, re-deploy and activate proprotor 558, rotate individual proprotor blades of proprotor 556 about 180 degrees about their long axis, and counter-rotate proprotor 556 with respect to its rotation in its horizontal orientation. In an embodiment, the step of rotating the individual proprotor blades about 180 degrees about their long axis and the step of tilting DMTPA 550 to a horizontal or vertical position are combined so that they occur concurrently.

In an alternative embodiment, both proprotors 546 and 548 of fore DMTPA 540 are used during forward flight and both proprotors 556 and 558 of rear DMTPA are also used during forward flight. In order to use both proprotors 556 and 558, hinge 559 comprising a rotational actuator are employed to reverse the pitch angle of the blades of proprotor 558, for example from +5° to −5°, such that its thrust is reversed and all four proprotors provide co-ordinated thrust to ensure forward flight. In another embodiment, proprotor 558 are used for helicopter mode and airplane mode, however in an embodiment of the invention proprotor 558 are counter-rotated during airplane mood such that its thrust is reversed and all four proprotors provide co-ordinated thrust to ensure forward flight. In an embodiment of the disclosure, the direction of rotation are slowly be adjusted as the rear DMTPA transitions about 90 degrees from facing upwards to a horizontal orientation.

In certain embodiments it is advantageous to tilt one or more TPAs so they are pointing downward. A disadvantage of this orientation is that the proprotor blades are more inclined to make contact with foreign bodies, particularly during VTOL when the vehicle is near the ground. Depending on the size, rotation speed and material from which the proprotor blades are made, will determine how much damage the blades can cause on impact with humans, animals, plant life or inanimate objects and/or how much the blades themselves are damaged following such an impact. Therefore, an aspect of the disclosure relates to providing deployable proprotor guards (PG) that protect foreign objects from coming into contact with the proprotors.

Figure 4A:
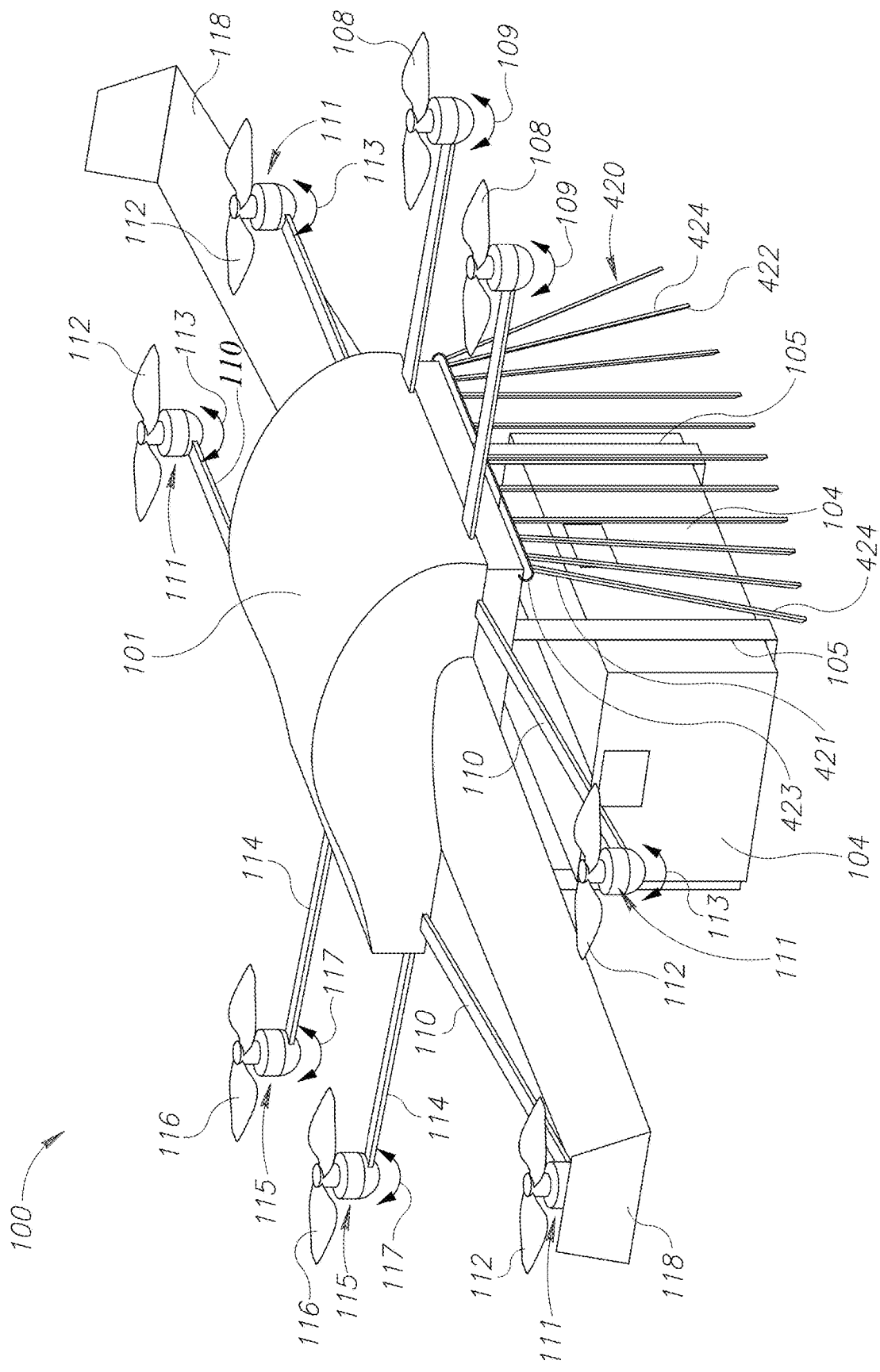
FIG. 4A schematically shows a UAV with proprotor guards (PGs) in a stowed position, in accordance with an embodiment of the disclosure.

FIG. 4A schematically shows UAV 100, which is identical to UAV 100 shown in FIG. 1A, with the exception that it further comprises a PG 420 in a stowed position, wherein PG 420 is stowed flush against the side of package 104 held by UAV 100. In an embodiment of the disclosure PG 420 is a comb-like structure comprising individual struts 424 that are connected to the main body of UAV 101 via a rotatable railing 423. As shown in FIG. 4A, struts 424 are in a slightly splayed conformation so that PG 420 is wider at its distal end 422 than its proximal end 421. Alternatively, PG 420 is rectangular in shape wherein the comb is substantially the same width at its proximal 421 and distal ends 422. UAV 100 optionally comprises PGs 420 on just one side or optionally on 2, 3 or 4 sides. If, however, PGs 420 are provided on all 4 sides of UAV 100 and they are also in a slightly splayed formation, they are optionally stowed at a slightly canted angle to allow for all PGs 120 to be accommodated against the side of the package. In addition, to ensure correct stowage and deployment and avoid PGs from different sides of UAV 100 colliding, UAV 100 is capable of sequential stowing and deployment of PGs 420. PGs 420 are optionally employed for protecting downward facing proprotors or for protecting upwards facing proprotors 108.

In an embodiment of the disclosure PGs are mesh-shaped. The benefits of the PGs being mesh shaped is that they provide further protection from/for the proprotors, as, in theory, very narrow objects may pass through the struts of the comb-like structure but not through a meshed structure. Conversely, the greater surface area of the mesh shaped PG may cause more interference with VTOL as compared to the comb-like structure because the mesh may cause more hinderance to downdraft from the proprotors.

Figure 4B:
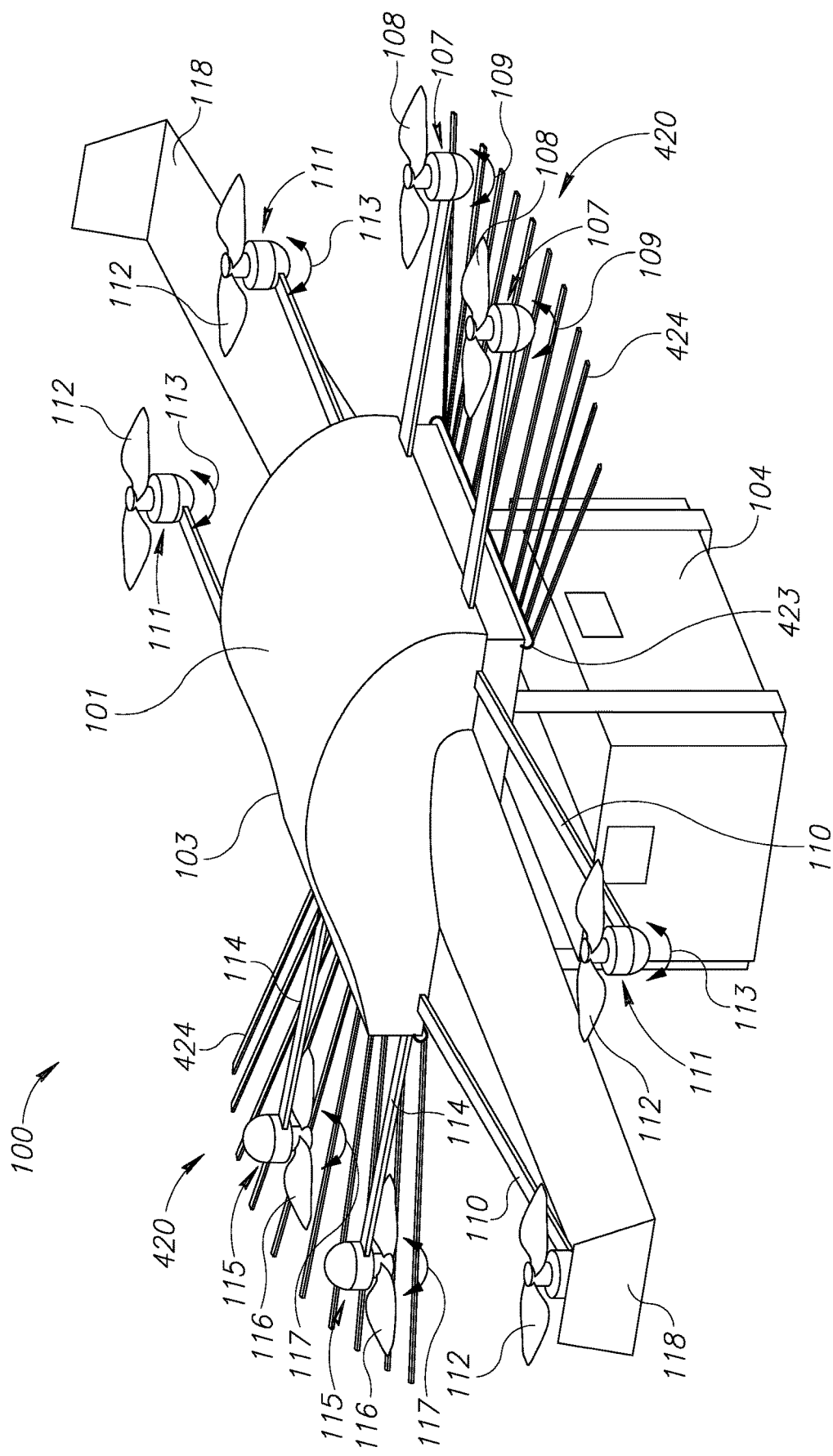
FIG. 4B schematically shows a UAV with PGs in a deployed position underneath the proprotors, in accordance with an embodiment of the disclosure.

FIG. 4B schematically shows PGs 420 in a deployed position. In an embodiment of the disclosure, railing 423 rotate upwards by 90 degrees from a downwards position to a position pointing away from UAV body 101. In the deployed position, struts 424 are positioned slightly underneath booms 106 and 114 and proprotors 108 and 116 and the struts are slightly splayed. In an embodiment, where there are a plurality of PGs 420 and they are all slightly splayed, deployment is sequential so that individual PGs do not collide with neighboring PGs. Whereas FIGS. 4A-4B show each PG 420 having ten (10) slats 424, the present disclosure is not limited to a particular number of slats per PG, or to a particular thickness or length of the slats. A PG in accordance with an embodiment of the disclosure comprises an appropriate number of slats, each slat having a length, stiffness, and thickness that is appropriate for withstanding the thrust created by the proprotors being guarded, as well as appropriate in light of the spatial relationship of the slats with each other, the proprotors, other PGs, and the rest of the UAV.

Figure 4C:
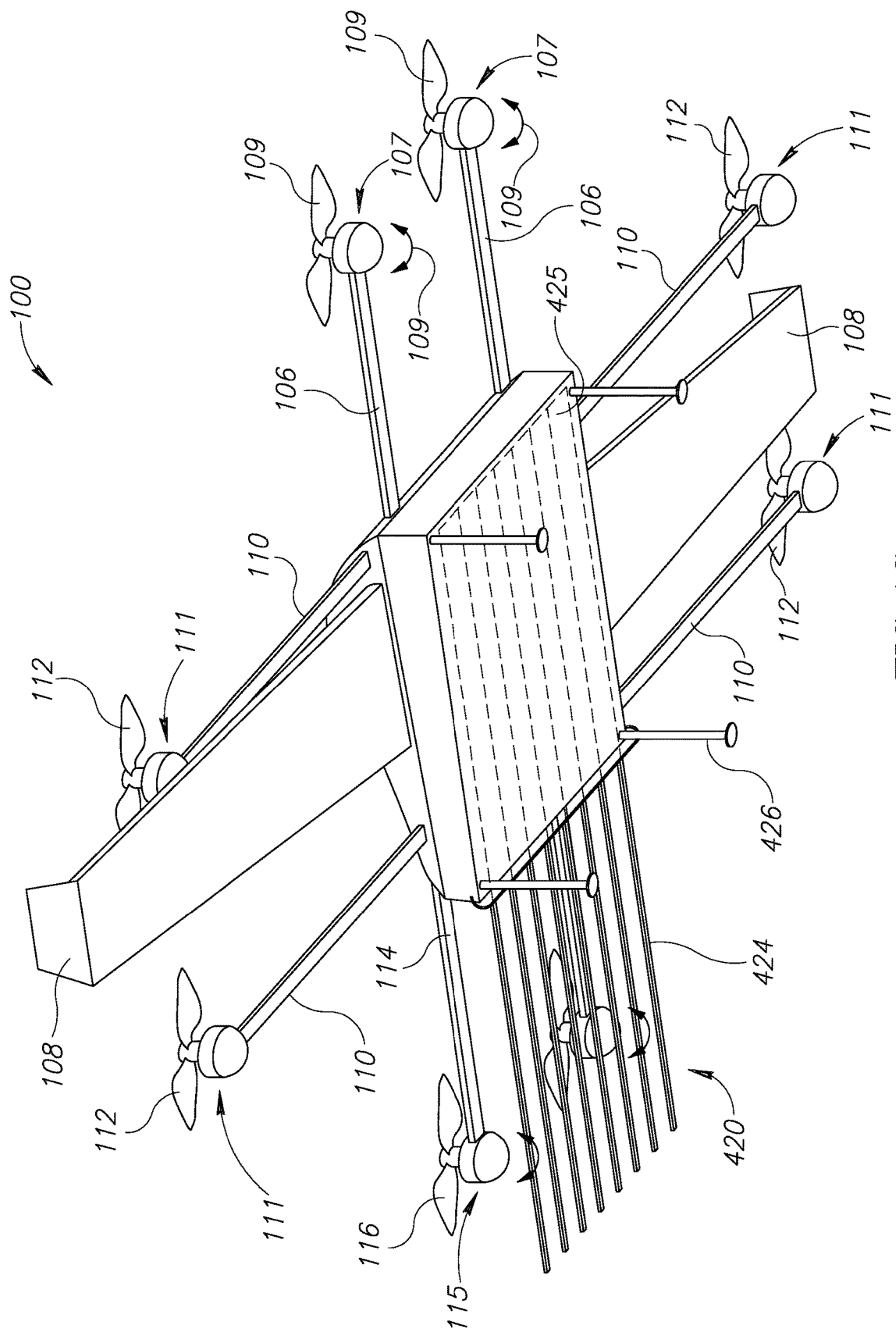
FIG. 4C schematically shows a UAV with PGs in a stowed position lying flush against the belly of the UAV and in a deployed state underneath the proprotors, in accordance with an embodiment of the disclosure.

FIG. 4C schematically shows PG 420 comprised in UAV 100 without a delivery package. In an embodiment of the disclosure, PG 420 (shown as dotted lines) is stowed flush against belly 425 of UAV 100. Optionally, PG 420 is attached at one end of UAV body 101 with pivotable railing 423 that is capable of pivoting about 180 degrees, first downwards and then upwards so that, in its deployed position, it is positioned underneath boom 114 and proprotors 116. In an embodiment of the disclosure, PG 420 is rectangular in shape and fits between UAV legs 426 in the stowed state. In an embodiment of the disclosure, UAV 100 comprises a plurality of PGs, each PG for protecting a subset of TPAs comprised in the UAV. By way of example, UAV 100 comprises two, three, or four PGs, each PG protecting the TPAs on a given side of UAV body 101. In an embodiment of the disclosure, in a case where UAV 100 comprises a plurality of PGs stowed against belly 425 of UAV body 101, the plurality of PGs are stowed and deployed sequentially in order to allow for correct stowage and deployment of the PGs and to avoid collision of one PG with its neighboring PG.

In an embodiment of the disclosure, a PG 420 is stowed flush against belly 425 of UAV 100 and deployed by rolling along guide rails (not shown). When a plurality of PGs are required, a plurality of guiderails is optionally used wherein the individual guiderails are positioned in slightly different planes so that the stowage and deployment of multiple PGs sliding in different directions is possible. In certain embodiments, one guide rail is used for PGs deployed in front of and behind the UAV and a second guide rail for the deployment of PGs to the two sides of the UAV. In this embodiment, the width of the PGs and the guiderails are optionally also be determined by the width between legs of the UAV. In an embodiment of the disclosure, guiderails are designed to incorporate a locking mechanism to ensure that PGs remain firmly in place directly underneath belly 425 of UAV 100 during horizontal flight or directly underneath the proprotors during VTOL.

Figure 4D:
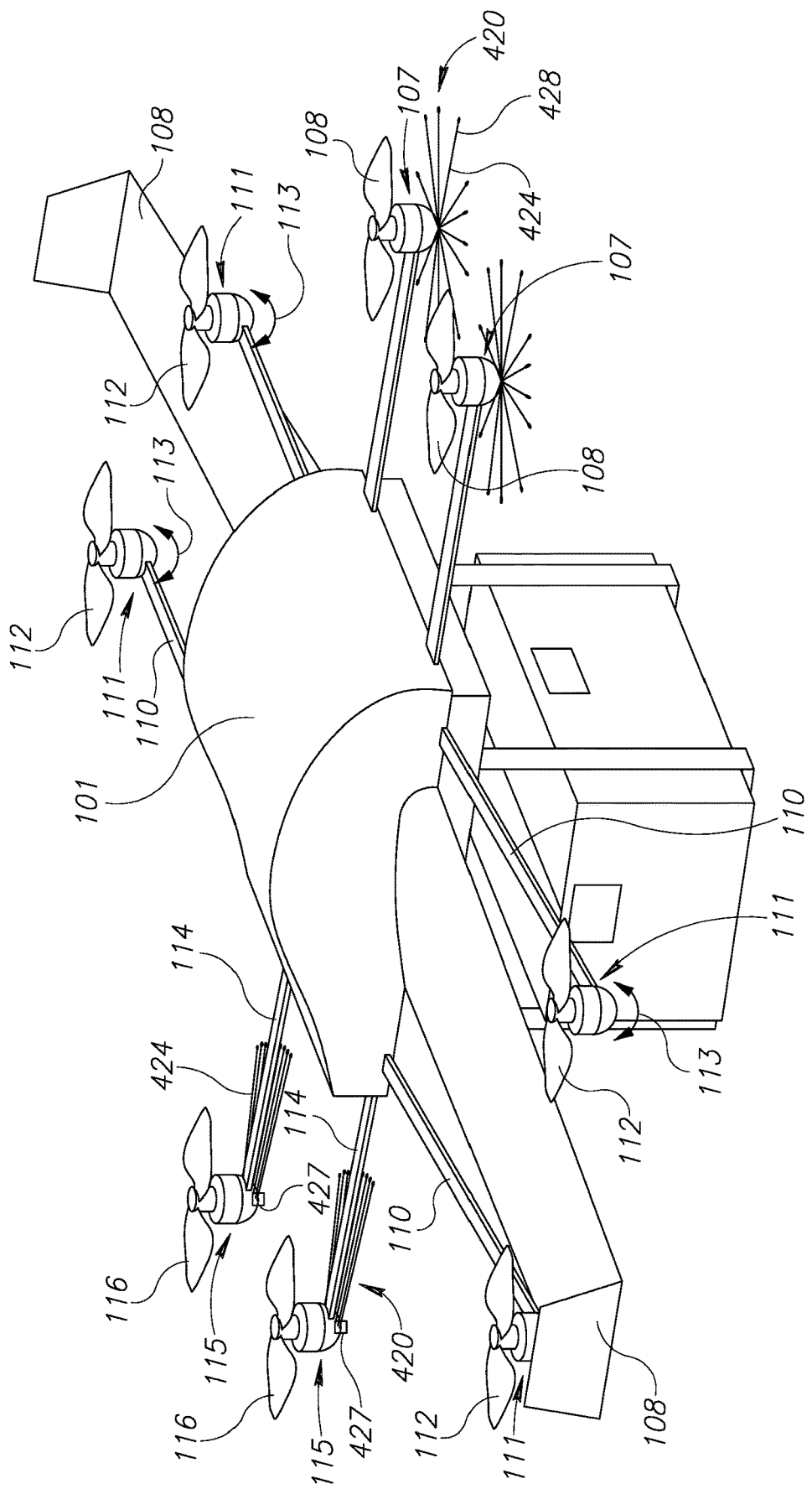
FIG. 4D schematically shows a UAV with fan-like PGs in stowed and deployed positions, in accordance with an embodiment of the disclosure.

FIG. 4D schematically shows an alternative, radial configuration of slats for PGs. In an embodiment of the disclosure, PG 420 comprises a plurality of individual struts 424, in which a proximal end of each strut is connected to a motorized pivotable mount 427 on the underside of boom 114 or underneath TPA 115. During horizontal flight, the PGs are stowed so that all struts are packed closely, with the struts lying substantially underneath boom 114 pointing away from motorized pivotable mount 427, optionally towards body 101 of UAV 100. In an embodiment where motorized pivotable mount 427 is positioned on the underside of boom 114, stowing the struts flush against or in close proximity to boom 114 will result in minimal drag during horizontal flight. PGs 420 are deployed during VTOL whereby struts 424, controlled by an actuator comprised in motorized pivotable mount 427 fan out radially such that when fully splayed, struts 424 are organized into a circular shape providing a barrier between proprotors 108 and any potential foreign bodies below the proprotors. In an embodiment of the disclosure individual struts 424 have rounded ends 428 in order to avoid PG 420 itself being a source of damage. An advantage of this embodiment is that, because PGs 420 are more compact, the stowage and deployment of an individual PG does not interfere with neighboring PGs, therefore there is no need to sequentially deploy or stow a plurality of PGs, rather they may all be stowed or deployed simultaneously. Whereas FIG. 4D shows each radial PG 420 having twelve (12) narrow slats 424, the present disclosure is not limited to a particular number of slats per PG, or to a particular thickness or length of the slats. A radial PG in accordance with an embodiment of the disclosure optionally comprises an appropriate number of slats, each slat having a length, stiffness, and thickness that is appropriate for withstanding the thrust created by the proprotors being guarded, as well as appropriate in light of the spatial relationship of the slats with each other, the proprotors, other PGs, and the rest of the UAV.

Figure 4F:
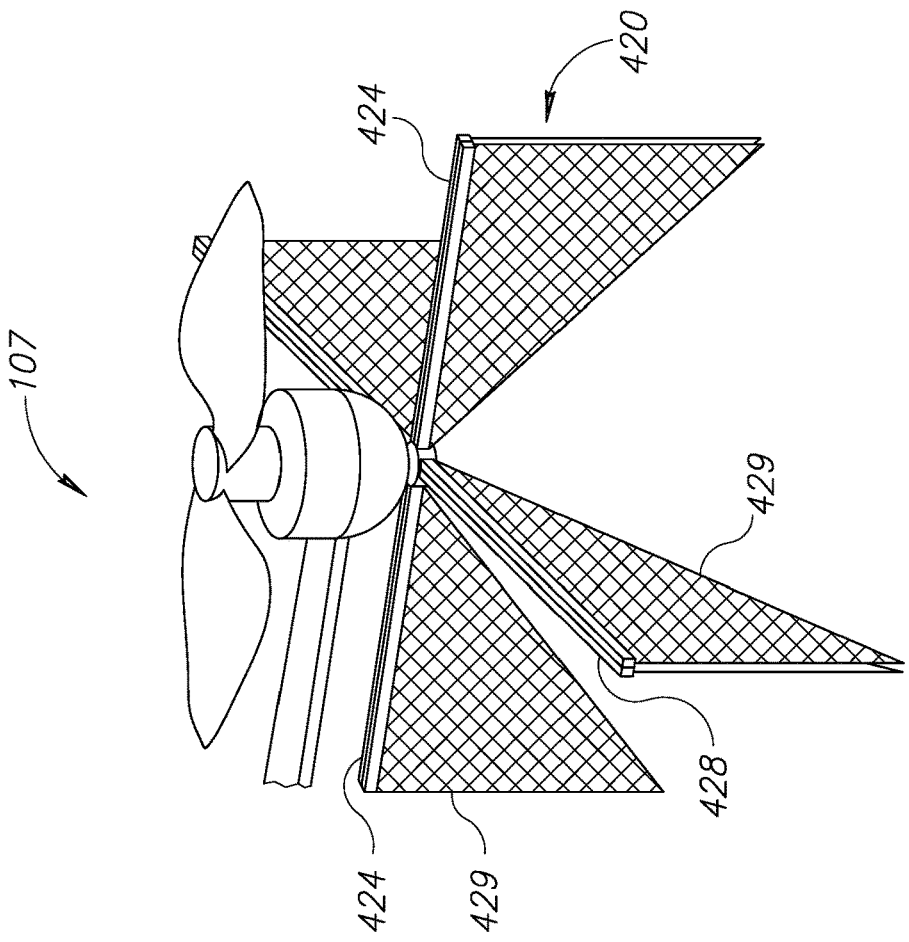
FIGS. 4E-4G schematically shows a UAV with alternative fan-like PGs in stowed, intermediate, and deployed positions, in accordance with an embodiment of the disclosure.
Figure 4E:
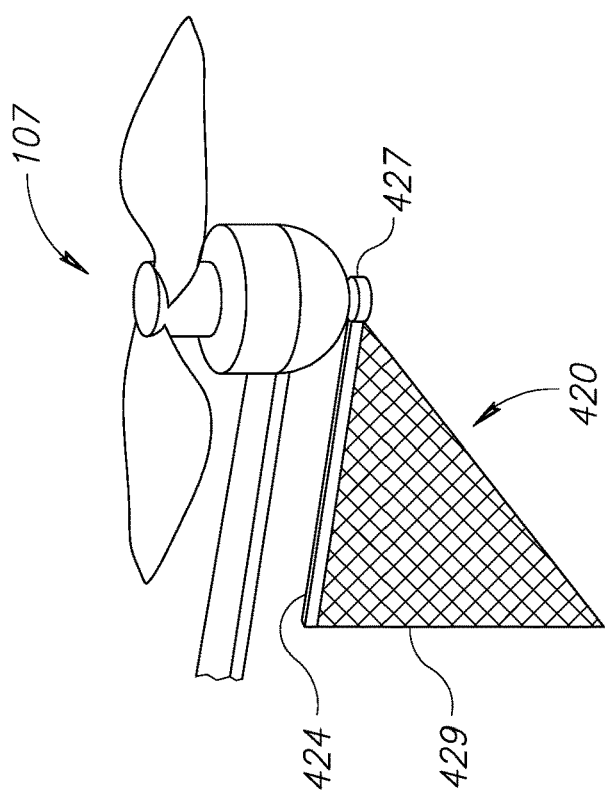
Figure 4G:
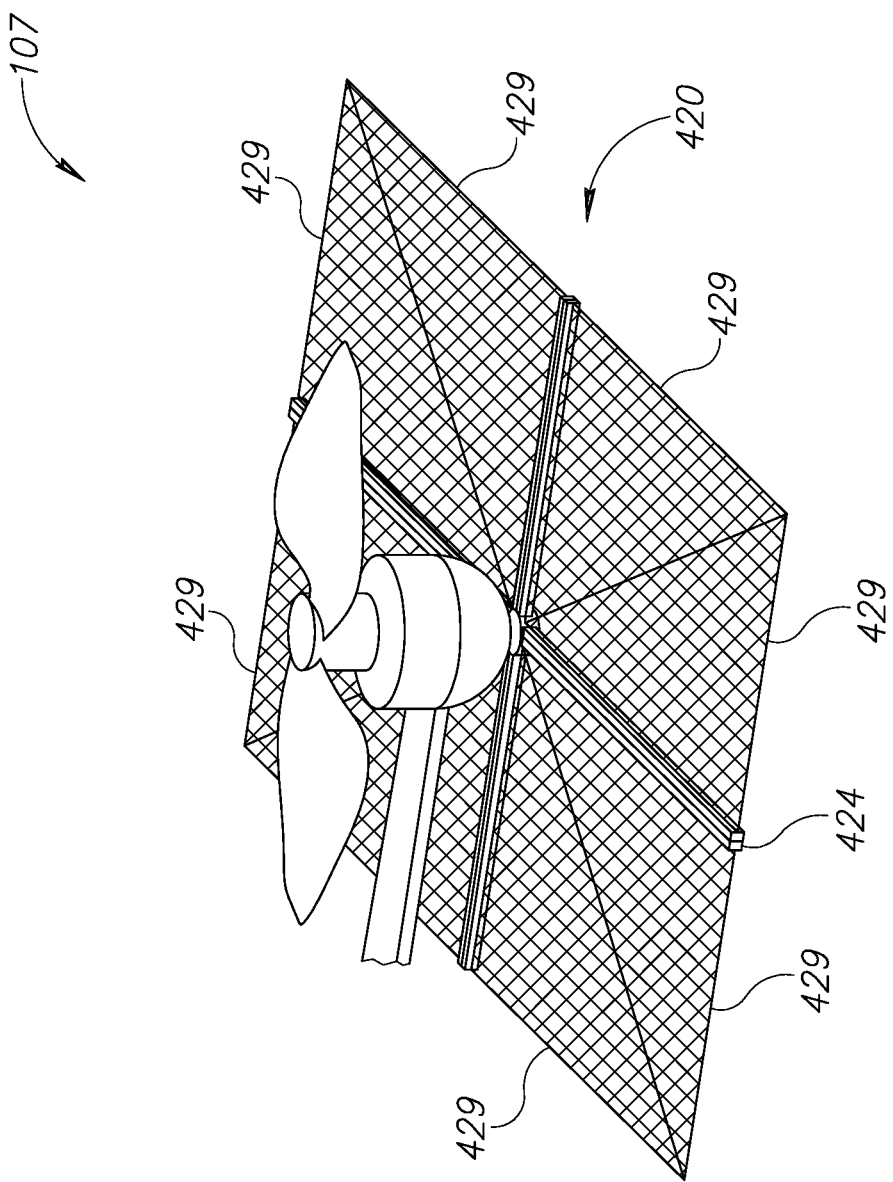

FIGS. 4E-G schematically shows an alternative configuration of PG 420, which like the PGs shown in FIG. 4D comprises individual struts 424, in which a proximal end of each strut is connected to a motorized pivotable mount 427 underneath TPA 115 (or alternatively on an underside of boom 114). In addition to what is shown in FIG. 4D, however, each strut 424 is pivotably attached to a pair of triangular guard panels 429, which are shaped to be create a partial barrier that is partially air-permeable, so that the lift generated by TPA 115 remains sufficient to maintain the CRA in vertical flight even when the guard panels are deployed (as shown in FIG. 4G). By way of example, each triangular guard panel 429 comprises an array of intersecting or parallel slats, an array of intersecting or parallel wires, or a wire mesh. FIG. 4E shows PG 420 in a stowed state, with struts 242 being packed closely with each other and lying substantially underneath boom 114. In addition, during the stowed state, each guard panel 429 is controlled to be oriented vertically downward so as minimize obstruction of downdraft generated by TPA 115.

FIG. 4F shows PG 420 in a transition state between the stowed state shown in FIG. 4E and a deployed state shown in FIG. 4G, in which struts 424 are fanned out to be maximally distant from each other, but guard panels 429 are oriented downward. In the fully deployed stated (FIG. 4G), the guard panels (or alternative the struts) are pivoted with an actuator (not shown) so that they are oriented horizontally so that the thrust created by TPA 107 is directed towards a face surface of the panels. to provide a physical barrier protecting the proprotors of the TPA from any object approaching from below. Optionally, guard panels 429 are shaped and dimensioned so that the respective edges on guard panels from adjacent struts 424 make, or almost make, contact with each other when in the deployed state in order to provide "full coverage" for proprotor protection.

Whereas FIGS. 4E-G each show a radial PG 420 having four (4) narrow slats 424, the present disclosure is not limited to a particular number of slats per PG, or to a particular thickness or length of the slats. It will be appreciated that the shape and dimension of the guard panels depends to the number of slats 424. In addition, while each slat 424 as shown in FIGS. 4E-4G is connected two guard panels 429, each slat 424 in an alternative embodiment is optionally connected to one guard panel, with the guard panel being appropriately shaped and dimensioned to provide full coverage.

Whereas FIGS. 4E-4G shows struts 424 connected to a motorized pivotable mount 427 positioned underneath TPA 115, the present disclosure also includes embodiments in which motorized pivotable mount 427 is placed on the underside of boom 114, with struts 424 in a stowed state pivoted to point towards the CRA body, so that the struts do not interfere with the tilting action of TPA 115 when transitioning between horizontal and vertical orientations.

Whereas with reference to FIGS. 4A-4G, deployable PGs 420 are described in the context of UAV 100, it will be appreciated that deployable PGs are not limited to application with UAVs, and may also be applied to TPAs comprised in manned CRAs, by way of example CRA 10 as shown in FIGS. 2A-2B. It will also be appreciated that, whereas with reference to FIGS. 4A-4G, deployable PGs 420 are described in the context of protecting proprotors, deployable PGs may also be applied to protecting any type of rotors in any type of aircraft, including helicopter rotors and ducted fans.

Proprotors and TPAs comprised in manned CRAs can generate downdraft of substantial force and strong vibration, which may be sufficiently strong to deform, move, or damage PGs and components thereof that are not sufficiently strong or secured to the aircraft. FIGS. 5A-5E schematically shows a PG 530 in accordance with an embodiment of the disclosure comprising a plurality of self-propelled slats 505 mounted on and movable along rods 504. In accordance with an embodiment of the disclosure, rods 504 are securely attached to a portion of a CRA, and each self-propelled slat 505 comprises an actuator that is operable to move the self-propelled slat along the length of the rods.

FIG. 5A schematically shows a CRA 500 as viewed from beneath the aircraft, the CRA comprising a rear TPA 502 that is pointed downwards. Two rods 504 extend out of a fuselage 501 of the CRA such that the rods extend past proprotors 503. Optionally, in their stowed position, individual self-propelled slats 505 are packed close together under the belly of the aircraft and away from the proprotors resulting in minimal drag during horizontal flight.

FIG. 5B schematically shows CRA 500 as viewed from beneath the aircraft, with self-propelled slats positioned in their deployed conformation. The individual slats 505, in their deployed state are positioned to provide a physical barrier below proprotor 503 and mitigate objects and debris striking proprotor 3 from below, whilst leaving sufficient space between the individual slats so that downdraft from the proprotors is not deleteriously blocked and proprotor 3 is still able to provide lift sufficient to keep CRA airborne while in helicopter flight.

In an embodiment of the disclosure, rods 504 are retractable, optionally to be partially retracted into fuselage 501 when PG 530 is in a stowed position and extended out from fuselage 501 when PG 530 is in a deployed position. In a case where rods 504 are retractable, movement of individual slats 505 are coordinated, optionally by a FCM, with retraction and extension of the rods.

Whereas FIGS. 5A-5B show each radial PG 530 having eight (8) self-propelled slats 505, the present disclosure is not limited to a particular number of self-propelled slats, or to a particular thickness or length of the self-propelled slats. Each self-propelled slat in accordance with an embodiment of the disclosure has a length, stiffness, and thickness that is appropriate for withstanding the thrust created by the proprotors being guarded, as well as appropriate in light of the spatial relationship of the slats with each other, the proprotors, and the rest of the UAV.

FIG. 5C schematically shows a close-up view of one of the plurality of self-propelled slats 505, coupled to two rods 504. Optionally, each self-propelled slat 505 is operable to move along the length of rods 504 independently of other self-propelled slats 505 coupled to the same rods. Optionally, each rod 504 is a threaded rod, and each self-propelled slat 505 houses a powered nut 508 comprising threading compatible with the threading of the threated rods, and rotation of powered nuts 508 coupled to the threaded rods, by way of example under control of a FCM, drives movement of the self-propelled slat along the length of the threaded rods. The use of a threaded rod and powered nut allows for accurate and stable positioning of the self-propelled slats. Optionally, motor 507 remains mechanically coupled to powered nut 508 when the self-propelled slat is stationary, so that the gearing and the motor provides additional stability for the self-propelled slat to remain in place and not be moved by external forces, such as downdraft from a TPA. Optionally, self-propelled slat 505 comprises a locking mechanism to lock the self-propelled slat in place along the thread rod, by way of example, a retractable rod that is controlled to couple to and prevent rotation of the powered nut when the self-propelled slat is not being moved during a stowed state or a deployed state.

In an embodiment of the disclosure, rotation of powered nut 508 is driven by an internal propelling module 520 housed within the self-propelled slat. In an embodiment of the disclosure, internal propelling module 520 comprises a motor 507, optionally a stepper motor, and a powered nut 508 that is rotationally coupled to the motor so that rotational motion generated by motor 507 is transduced to rotate the powered nut around a threaded rod 504. Optionally, as shown in FIG. 5C, powered nut 508 is external to motor 507, and the motor and powered nut are rotationally coupled via a gearing 506. Various examples of gearing capable of rotational coupling are known in the art. Optionally, powered nut 508 is comprised within motor 507 (not shown).

Optionally, an FCM is configured to control motors 507 via a wired connection (not shown) or a wireless connection (not shown). Power is optionally provided to motor 507 by a battery (not shown) housed in the self-propelled slat. Alternatively or additionally, power is provided to motor 507 by an electricity source (not shown), by way of example a battery or a generator, mounted elsewhere in CRA 500, which electricity source is operatively connected to the motor via a conductive connection (not shown). Optionally, the conductive connection comprises a pair of wires or a pair of threaded rods 504. Optionally, electricity provided by the electricity source via threaded rod 504 is passed onto powered nut 508 via a conducting brush (not shown), then to motor 507 from powered nut 508 via gearing 506.

In an embodiment of the disclosure, self-propelled slats are operable, optionally controlled by an FCM, to transition between a deployed state and a stowed state. In a deployed state, self-propelled slats 505 position themselves along the length of threaded rods 504 so that the slats are arranged as a grating positioned under proprotor 503 with gaps between adjacent slats to allow sufficient passage of downdraft created by the proprotor to provide lift for the CRA during helicopter flight (as schematically shown in FIG. 5B). In a stowed state, the slats together without gaps between them and against belly 501 of CRA 500 (as schematically shown in FIG. 5A) so as to reduce impedance of the downdraft created by proprotor 503 during vertical flight and/or to mitigate drag caused by the slats during horizontal flight.

Figure 5E:
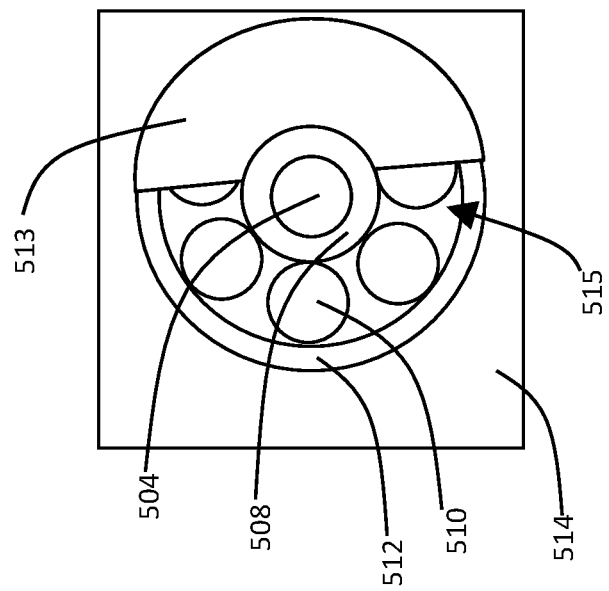
Figure 5D:
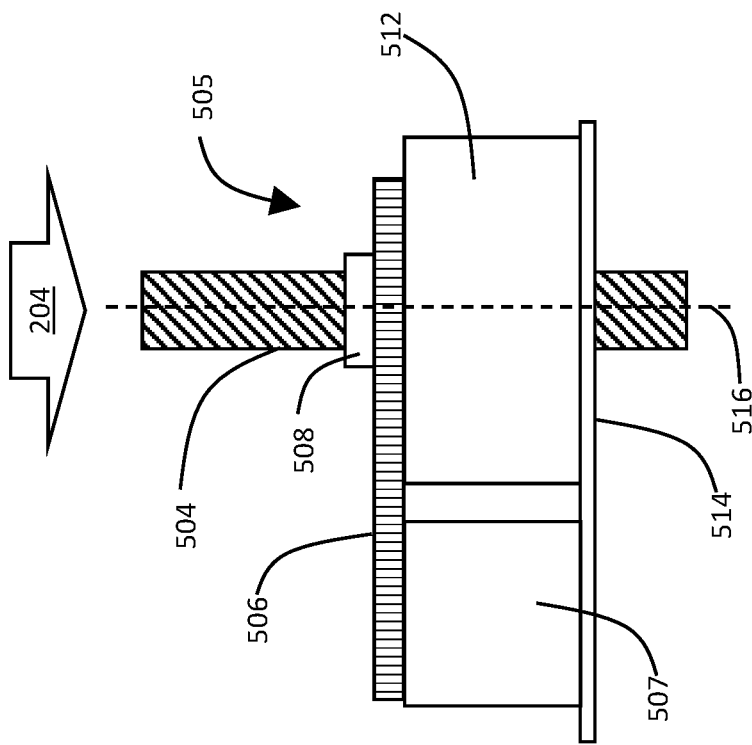

FIG. 5D schematically shows a further close-up, partial view of a self-propelled slats 505 in accordance with an embodiment of the disclosure, showing a portion of an outer cover 514 of the self-propelled slat, which cover houses a drive mechanism comprising, inter alia, motor 507, powered nut 508, and gearing 506. Optionally, powered nut 508 is housed within an exterior case 512 that is immovably, physically coupled to outer cover 514 of the self-propelled slat and is configured to hold the powered nut in place within the exterior case while allowing the powered nut to rotate around a longitudinal axis (schematically shown as dotted line 516) of threaded rod 504. As a result, rotation of the rotational nut drives movement of the entire self-propelled slat along the length of the threaded rod. Optionally, a portion of powered nut 508 extends out from exterior case 512 to provide access for gearing 506 to couple with the powered nut.

FIG. 5E schematically shows an alternative view of powered nut 508 and exterior case 512, viewed along longitudinal axis 516 of threaded rod 504, as indicated by block arrow 204 in FIG. 5D. A cover 513 for exterior case 512 is schematically shown as partially removed to provide a view inside the exterior case. Optionally, exterior case 512 comprises a cylindrical chamber 515 that houses a plurality of roller bearings 510 surrounding powered nut 508, thus allowing powered nut 508 to freely rotate, with respect to the external case, around threaded rod 504. Optionally, propelling module 520 is configured so that powered nut 508 can be made to be freely rotatable with respect to motor 507, by way of example during a time that the motor is not activated to move the self-propelled slat. By way of example, a FCM in accordance with an embodiment of the disclosure is configured to control gearing 506 to disengage from the powered nut when the motor is not active, and control the gearing to engage with the powered nut prior to activating the motor. Optionally, the FMC is configured to control a propelling module 520 of a first self-propelled slat to have motor 507 disengage from powered nut 508 responsive to the motor being damaged and/or otherwise inoperable, and to control one or both of the adjacent self-propelled slats to push the first self-propelled slat into a designated position along the threaded rods when transitioning between a stowed stated and a deployed state.

FIG. 5F schematically shows self-propelled slat 505 mounted on two rods 504A and 504B from a perspective along the longitudinal axes of the rods as indicated by block arrow 204 in FIG. 5D, from behind rear TPA 502 (not shown) towards fuselage 501 (not shown). The embodiment of the disclosure shown in FIG. 5F corresponds to what is shown in FIGS. 5A-5C, in which a left rod 504A and a right rod 504B are arranged horizontally with respect to each other. The rods are optionally positioned near the respective ends of self-propelled slat 505 as shown in FIG. 5F. In another optional embodiment, a substantial portion of self-propelled slat 505 extends beyond the position of the rods.

FIG. 5G schematically shows an alternative embodiment of a self-propelled slat, self-propelled slat 505', with the same perspective for self-propelled slat 505 in FIG. 5F. Optionally, self-propelled slat 505' is connected to fuselage 501 (not shown) by an upper rod 504A and a lower rod 504B arranged vertically with respect to each other, at a same position along a longitudinal axis (schematically shown as dotted line 517) of self-propelled slat 505'. Optionally, a center portion 522 of self-propelled slat 505' is shaped to be wider that the rest of the self-propelled slat to provide more space for propelling module 520 and/or to reduce torque applied to the rods by movement of the self-propelled slats, by way of example caused by thrust produced by a proprotor being guarded by the self-propelled slats.

It will be appreciated that a horizontal arrangement of rods 504, with a relatively large distance between left rod 504A and right rod 504B as shown in FIG. 5F serves to lessen torque applied to rods 504A and 504B. On the other hand, it will be appreciated that a vertical arrangement of rods 504A and 504B as shown in FIG. 5G serves to lessen obstruction of downdraft produced by rear-TPA 502 when self-propelled slats 505' are in a stowed position. In addition, having the profile of the self-propelled slats in a cross-shape, as shown in FIG. 5 serves to provide both of: a relatively large distance between rods 504A and 504B, as well as a vertical arrangement of the pair of rods.

Whereas, with reference to FIGS. 5A-5G, deployable PG 530 comprising a plurality of self-propelled slats 505 mounted on and movable along rods 504 was described above in the context of CRA 500 to protect a rear proprotor 502, it will be appreciated that a PG 530 may also be applied to protecting a proprotor mounted on a UAV as shown by way of example in FIGS. 1A-1B and FIGS. 4A-4G. It will also be appreciated that, whereas with reference to FIGS. 5A-5G, deployable PG 530 is described in the context of protecting proprotors, deployable PGs may also be applied to protecting any type of rotors in any type of aircraft, including helicopter rotors and ducted fans.

Whereas internal propelling module 520 was described above in the context of driving movement of self-propelled slats along a length of rods 504, the rod optionally being threaded, it will be appreciated that an internal propelling module may be mounted within any object for which providing steady and secure movement along a rod would be desirable.

There is therefore provided in an embodiment of the disclosure a convertible rotor aircraft CRA able to convert between airplane and helicopter flight modes during flight, comprising a tiltable proprotor assembly TPA comprising a proprotor rotated by a rotating engine pod REP and tiltable to change the axis of rotation of the proprotor, between a first orientation wherein the proprotor is above the REP for the helicopter flight mode and a second orientation wherein the proprotor is behind the REP for the airplane flight mode; and a flight control module FCM configured to control the TPA to reverse direction of thrust generated by the proprotor relative to the TPA when the TPA transitions between the first orientation and the second orientation. Optionally, the TPA is mounted at a rear portion of the CRA. Optionally, the CRA further comprises a second TPA mounted at a front portion of the CRA that is tiltable between a first orientation wherein the proprotor is above the REP for the helicopter flight mode and a second orientation wherein the proprotor is in front of the REP for the airplane flight mode. Optionally, the CRA is an aircraft capable of carrying passengers. Optionally, the CRA is an unmanned aerial vehicle UAV.

In an embodiment of the disclosure, each blade of the proprotor is rotatable around its respective long axis to change an angle of attack, and the FCM is configured to reverse the angle of attack of the proprotor blades in coordination with the tilting of the TPA between the first and second orientations. Optionally, the angle of attack is reversed between about +5° and about −5°.

In an embodiment of the disclosure, the direction of rotation of the proprotor is reversible, and the FCM is configured to reverse the direction of rotation of the proprotor in coordination with the tilting of the TPA between the first and second orientations.

In an embodiment of the disclosure, the rotation of the proprotor is reversible and each blade of the proprotor is operable to rotate about 180 degrees about each blade's long axis; and the FCM is configured to reverse direction of rotation of the proprotor and rotate each blade of the proprotor about 180 degrees about each blade's long axis in coordination with the tilting of the TPA between the first and second orientations.

In an embodiment of the disclosure, the TPA comprises a first proprotor and a second proprotor arranged in a coaxial arrangement, the first and second proprotors are configured to produce thrust in opposite directions with respect to each other, and the FCM is configured to engage rotation of the first proprotor and disengage rotation of the second proprotor in coordination with the tilting of the TPA between the first and second orientations.

There is also provided in accordance with an embodiment of the disclosure an aircraft comprising at least one rotor and at least one deployable guard configured to have a stowed state and a deployed state, wherein: the guard in the deployed state is controlled to be configured as a partially air-permeable barrier and positioned below the rotor so that thrust produced by the rotor is directed towards the partially air-permeable barrier; and the guard in the stowed state is controlled to be configured to reduce impedance of the thrust by the rotor compared to the deployed state. Optionally, the aircraft capable of carrying passengers. Optionally, the aircraft is an unmanned aerial vehicle.

In an embodiment of the disclosure, the aircraft is a convertible rotor aircraft CRA able to convert between airplane and helicopter flight modes during flight, and the rotor is a proprotor, wherein the CRA comprises a tiltable proprotor assembly TPA comprising a proprotor rotated by a rotating engine pod REP and tiltable to change the axis of rotation of the proprotor between a vertical orientation wherein the axis of rotation of the proprotor is vertical for the helicopter flight mode and a horizontal orientation wherein the axis of rotation of the proprotor is horizontal for the airplane flight mode.

In an embodiment of the disclosure, the partially air-permeable barrier comprises a plurality of slats pivotably connected to a portion of the aircraft. Optionally, the partially air-permeable barrier comprises the plurality of slats, which are arranged substantially along a common plane with gaps between adjacent slats.

In an embodiment of the disclosure, the partially air-permeable barrier comprises a partially air-permeable panel pivotably connected to a portion of the aircraft. Optionally, the partially air-permeable panel comprises a selection from: an array of intersecting or parallel slats, an array of intersecting or parallel wires, and a wire mesh. Optionally, the partially air-permeable panel is controlled so that: during a deployed state, a face surface of the partially air-permeable panel is oriented to be substantially perpendicular with respect to the thrust generated by the rotor; and during a stowed state, the face surface of the partially air-permeable panel is oriented to be substantially parallel with respect to the thrust generated by the rotor.

In an embodiment of the disclosure, the partially air-permeable barrier is controlled to be flush against a surface of a body of the aircraft during the stowed state.

In an embodiment of the disclosure, the aircraft is operable to carry a package external to the aircraft. Optionally, partially air-permeable barrier is controlled to be flush against a surface of the package during the stowed state.

In an embodiment of the disclosure, one end of each slat is connected to a common motorized pivotable mount; during the stowed state, the plurality of slats are arranged to be substantially flush against each other compared to the deployed state; and during the deployed state, the plurality of slats are spread out radially. Optionally, each slat of the plurality of slats is pivotably connected to one or two partially air-permeable guard panels. Optionally, the guard panel comprises one or more of: an array of intersecting or parallel slats, an array of intersecting or parallel wires, and a wire mesh. Optionally, during the deployed state, the face surface of the guard panel is oriented to be substantially perpendicular with respect to the thrust generated by the rotor; and during the stowed state, the face surface of the guard panel is oriented to be substantially parallel with respect to the thrust generated by the rotor.

In an embodiment of the disclosure, the guard comprises a plurality of self-propelled slats that are operable to move along a length of at least one rod. Optionally, during the deployed state, the plurality of self-propelled slats are controlled to be arranged substantially along a common plane with gaps between adjacent self-propelled slats; and during the stowed state, each of the plurality of self-propelled slats are controlled to be substantially flush against the adjacent self-propelled slats compare to the deployed state. Optionally, each self-propelled slat of the plurality of self-propelled slats is operable to move along the length of the at least one rod independently of other self-propelled slats of the plurality of self-propelled slats. Optionally, each self-propelled slat comprises at least one motor configured to move the self-propelled slat along the length of the at least one threaded rod. Optionally, each of the at least one rod is a threaded rod; and each self-propelled slat comprises at least one nut coupled to the at least one motor, wherein each nut of the at least one nut is mechanically coupled to and rotatable around a corresponding threaded rod of the at least one threaded rod, and the at least one nut and the at least one threaded rod are configured so that rotation of the at least one nut results in movement of the slat along a length of the at least one threaded rod.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the disclosure in the present application are provided by way of example and are not intended to limit the scope of the disclosure. The described embodiments comprise different features, not all of which are required in all embodiments. Some embodiments utilize only some of the features or possible combinations of the features. Variations of embodiments of the disclosure that are described, and embodiments comprising different combinations of features noted in the described embodiments, will occur to persons of the art. The scope of the invention is limited only by the claims.

The invention claimed is:

1. An aircraft comprising:
at least one deployable rotor guard configured to have a stowed state and a deployed state, wherein:
the rotor guard in the deployed state is controlled to be configured as a partially air-permeable barrier comprising a plurality of slats pivotably connected to a portion of the aircraft and positioned so that thrust produced by a rotor is directed towards the partially air-permeable barrier; and
the rotor guard in the stowed state is controlled to be configured to reduce impedance of the thrust compared to the deployed state.

2. The aircraft of claim 1, wherein the partially air-permeable barrier comprises the plurality of slats, which are arranged substantially along a common plane with gaps between adjacent slats.

3. The aircraft of claim 1, wherein the partially air-permeable barrier comprises a partially air-permeable panel pivotably connected to a portion of the aircraft.

4. The aircraft of claim 3, wherein the partially air-permeable panel comprises a selection from: an array of intersecting or parallel slats, an array of intersecting or parallel wires, and a wire mesh.

5. The aircraft of claim 3, wherein the partially air-permeable panel is controlled so that:
during a deployed state, a face surface of the partially air-permeable panel is oriented to be substantially perpendicular with respect to the thrust generated by the rotor; and
during a stowed state, the face surface of the partially air-permeable panel is oriented to be substantially parallel with respect to the thrust generated by the rotor.

6. The aircraft of claim 1, wherein the partially air-permeable barrier is controlled to be flush against a surface of a body of the aircraft during the stowed state.

7. The aircraft of claim 1, wherein the aircraft is operable to carry a package external to the aircraft.

8. The aircraft of claim 1, wherein:
one end of each slat is connected to a common motorized pivotable mount;
during the stowed state, the plurality of slats are arranged to be substantially flush against each other compared to the deployed state; and
during the deployed state, the plurality of slats are spread out radially.

9. The aircraft of claim 8, wherein each slat of the plurality of slats is pivotably connected to one or two partially air-permeable guard panels.

10. The aircraft of claim 9, wherein the guard panel comprises one or more of: an array of intersecting or parallel slats, an array of intersecting or parallel wires, and a wire mesh.

11. The aircraft of claim 9, wherein:
during the deployed state, the face surface of the guard panel is oriented to be substantially perpendicular with respect to the thrust generated by the rotor; and
during the stowed state, the face surface of the guard panel is oriented to be substantially parallel with respect to the thrust generated by the rotor.

12. An aircraft comprising at least one deployable rotor guard configured to have a stowed state and a deployed state, and comprising a plurality of self-propelled slats that are operable to move along a length of at least one rod wherein:

the rotor guard in the deployed state is controlled to be configured as a partially air-permeable barrier and positioned so that thrust produced by a rotor is directed towards the partially air-permeable barrier; and the rotor guard in the stowed state is controlled to be configured to reduce impedance of the thrust compared to the deployed state.

13. The aircraft according to claim 12, wherein:

during the deployed state, the plurality of self-propelled slats are controlled to be arranged substantially along a common plane with gaps between adjacent self-propelled slats; and during the stowed state, each of the plurality of self-propelled slats are controlled to be substantially flush against the adjacent self-propelled slats compare to the deployed state.

14. The aircraft of claim 12, wherein each self-propelled slat of the plurality of self-propelled slats is operable to move along the length of the at least one rod independently of other self-propelled slats of the plurality of self-propelled slats.

15. The aircraft of claim 14, wherein each self-propelled slat comprises at least one motor configured to move the self-propelled slat along the length of the at least one threaded rod.

16. The aircraft of claim 15, wherein:

each of the at least one rod is a threaded rod; and each self-propelled slat comprises at least one nut coupled to the at least one motor, wherein each nut of the at least one nut is mechanically coupled to and rotatable around a corresponding threaded rod of the at least one threaded rod; and the at least one nut and the at least one threaded rod are configured so that rotation of the at least one nut results in movement of the slat along a length of the at least one threaded rod.

17. The aircraft according to claim 1, wherein the aircraft is an aircraft capable of carrying passengers and/or is an unmanned aerial vehicle.

18. The aircraft according to claim 1, the aircraft being a convertible rotor aircraft (CRA) able to convert between airplane and helicopter flight modes during flight, wherein:

the rotor is a proprotor; and the aircraft comprises at least one tiltable proprotor assembly (TPA) comprising the proprotor rotated by a rotating engine pod (REP) and tiltable to change the axis of rotation of the proprotor between a vertical orientation wherein the axis of rotation of the proprotor is vertical for the helicopter flight mode and a horizontal orientation wherein the axis of rotation of the proprotor is horizontal for the airplane flight mode.

* * * * *